United States Patent
Inada

(10) Patent No.: US 11,544,822 B2
(45) Date of Patent: Jan. 3, 2023

(54) IMAGE GENERATION APPARATUS AND IMAGE GENERATION METHOD

(71) Applicant: SONY INTERACTIVE ENTERTAINMENT INC., Tokyo (JP)

(72) Inventor: Tetsugo Inada, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/421,630

(22) PCT Filed: Jan. 21, 2019

(86) PCT No.: PCT/JP2019/001693
§ 371 (c)(1),
(2) Date: Jul. 8, 2021

(87) PCT Pub. No.: WO2020/152754
PCT Pub. Date: Jul. 30, 2020

(65) Prior Publication Data
US 2022/0076389 A1    Mar. 10, 2022

(51) Int. Cl.
*G06T 5/00* (2006.01)
*G06F 3/01* (2006.01)
*G06T 15/04* (2011.01)

(52) U.S. Cl.
CPC .............. *G06T 5/006* (2013.01); *G06F 3/012* (2013.01); *G06F 3/013* (2013.01); *G06T 15/04* (2013.01)

(58) Field of Classification Search
CPC .................................. G06T 5/006; G06F 3/012
See application file for complete search history.

(56) References Cited

U.S. PATENT DOCUMENTS

2017/0307894 A1* 10/2017 Aoki ..................... G06T 5/006
2018/0276790 A1*  9/2018 Mantor ................. G06T 15/80
2018/0350032 A1   12/2018 Bastani et al.

FOREIGN PATENT DOCUMENTS

JP    2001034161 A    2/2001
JP    2004-72553 A    3/2004
(Continued)

OTHER PUBLICATIONS

J. A. Jones, L. C. Dukes, D. M. Krum, M. T. Bolas and L. F. Hodges, "Correction of geometric distortions and the impact of eye position in virtual reality displays," 2015 International Conference on Collaboration Technologies and Systems (CTS), 2015, pp. 77-83, doi: 10.1109/CTS.2015.7210403. (Year: 2015).*

(Continued)

*Primary Examiner* — Shivang I Patel
(74) *Attorney, Agent, or Firm* — Katten Muchin Rosenman LLP

(57) ABSTRACT

An image generation apparatus 200 includes a distortion information storage section 234 that stores, as distortion information, information for deforming and distorting an image, and a distortion rendering section 232 that renders a distorted image by rasterization processing using the distortion information without generating a non-distorted image in a memory. The distortion rendering section 232 renders the distorted image by executing the rasterization processing on a distorted triangle obtained by transforming a triangle to be rasterized on the basis of the distortion information such that the processing is executed upward and downward from positions of vertices of the distorted triangle.

8 Claims, 30 Drawing Sheets

FIG.2

(56) References Cited

FOREIGN PATENT DOCUMENTS

| JP | 2016-85586 | A | 5/2016 |
|----|-----------|---|--------|
| JP | 2017-97122 | A | 6/2017 |
| JP | 2018-49603 | A | 3/2018 |
| WO | 2014033913 | A1 | 3/2014 |

OTHER PUBLICATIONS

International Search Report and Written Opinion dated Apr. 16, 2019, from PCT/JP2019/001693, 8 sheets.
International Preliminary Report on Patentability dated Jul. 29, 2021, from PCT/JP2019/001693, 12 sheets.
The extended European search report dated Aug. 1, 2022, from European Patent Application No. 19911390.3.
Brown M S et al.: "Restoring 2D Content from Distorted Documents", IEEE Transactions on Pattern Analysis and Machine Intelligence, IEEE Computer Society, USA, vol. 29, No. 11, Nov. 1, 2007 (Nov. 1, 2007), pp. 1904-1916, XP011191986, ISSN: 0162-8828, DOI: 10.1109/TPAMI.2007.1118.
Grompone Von Gioi R et al.; "Towards high-precision lens distortion correction" 2010 17th IEEE International Conference on Image Processing (ICIP 2010); Sep. 26-29, 2010; Hong Kong, China, IEEE, Piscataway, NJ, USA, Sep. 26, 2010 (Sep. 26, 2010), pp. 4237-1240, XP031813423, ISBN: 978-1-4244-7992-4.
Jones J Adam et al: "Correction of geometric distortions and the impact of eye position in virtual reality displays", 2015 International Conference on Collaboration Technologies and Systems (CTS), IEEE, Jun. 1, 2015 (Jun. 1, 2015), pp. 77-83, XP033196699, DOI: 10.1109/CTS.2015.7210403 ISBN: 978-1-4673-7647-1 [retrieved on Aug. 19, 2015].
Notice of Reasons for Refusal dated Sep. 6, 2022, from Japanese Patent Application No. 2020-567682, 4 sheets.

\* cited by examiner

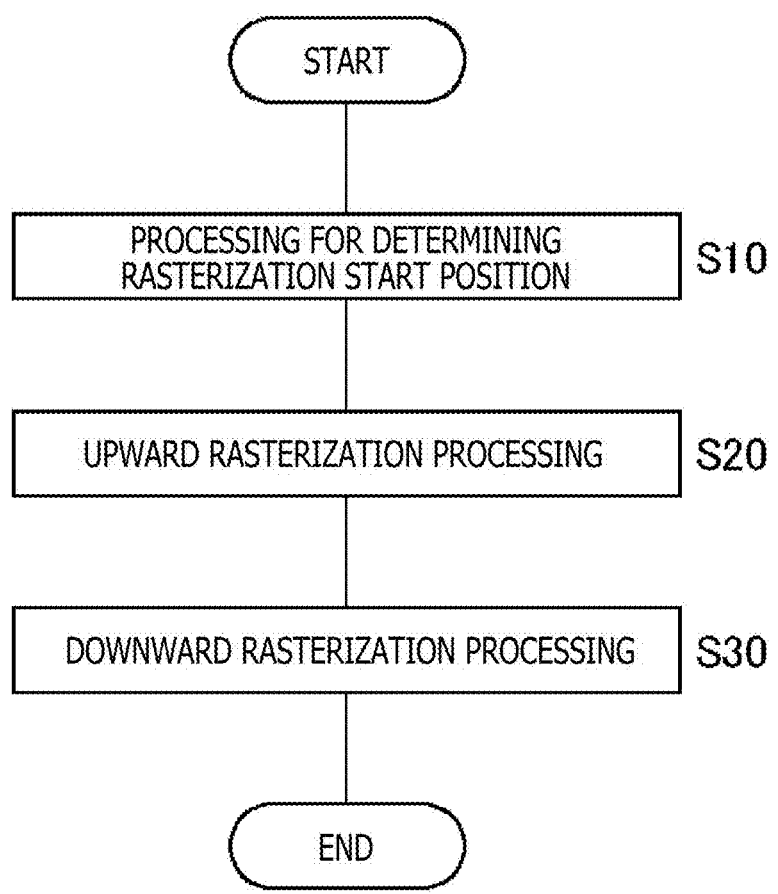

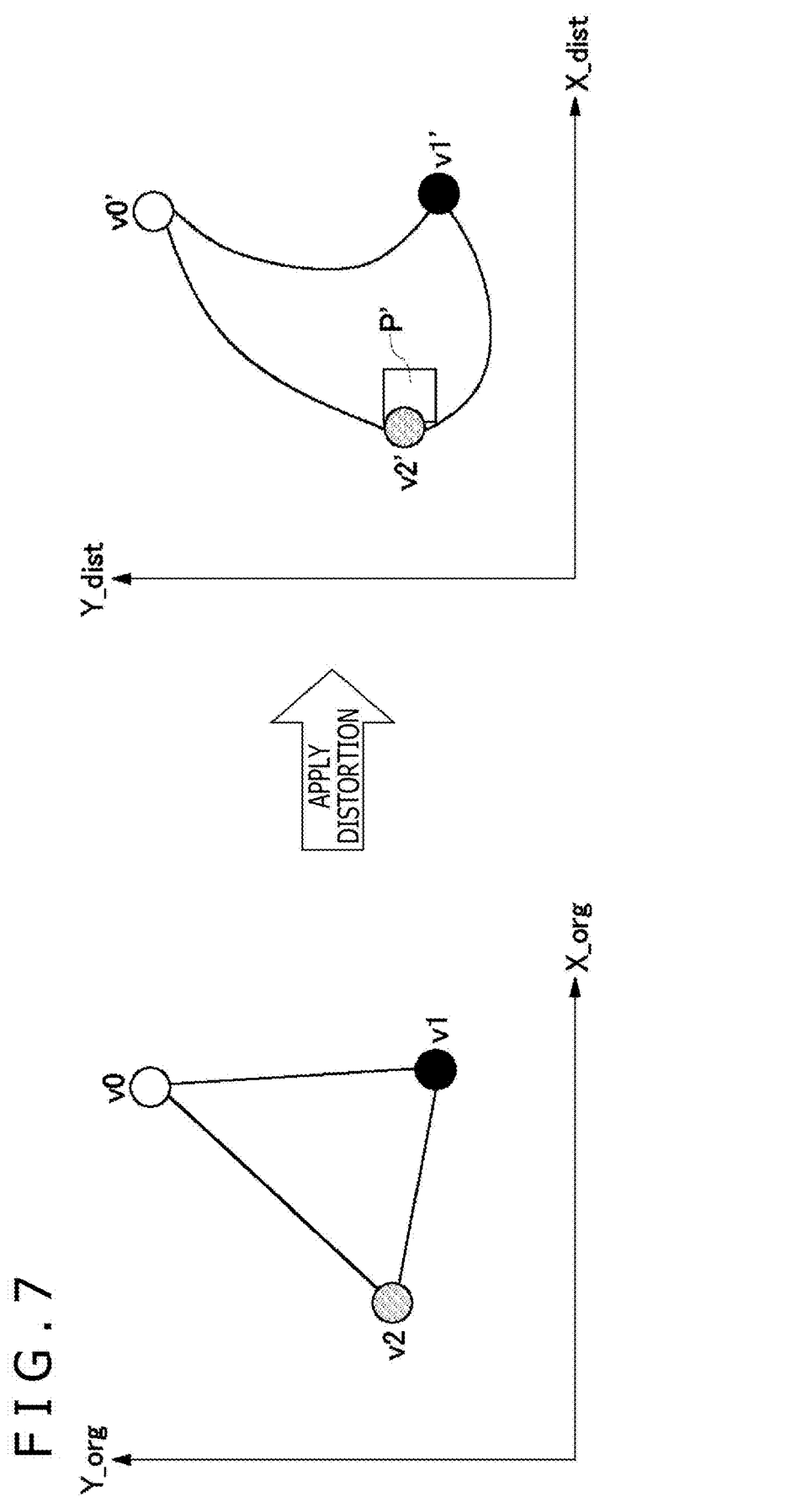

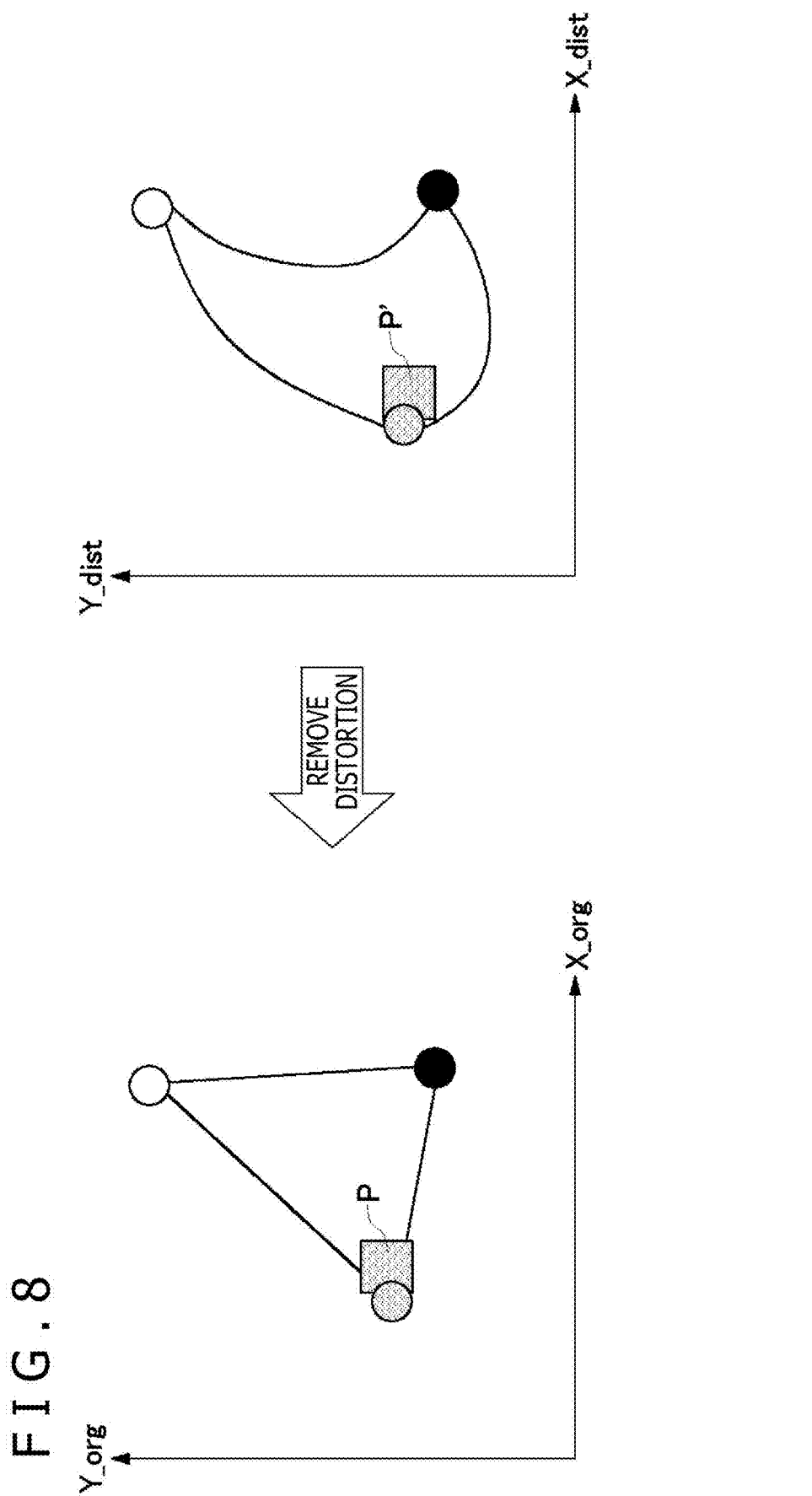

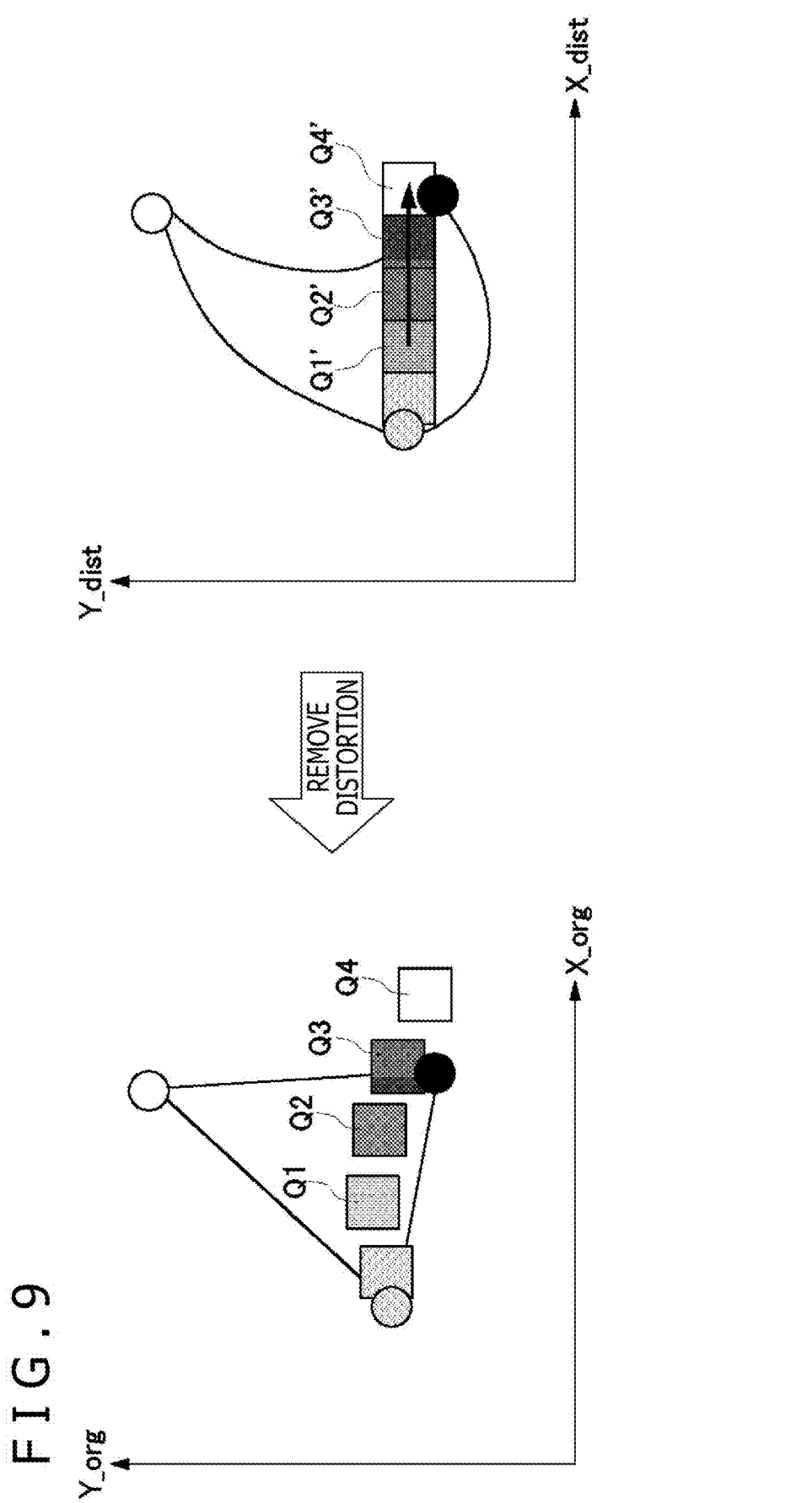

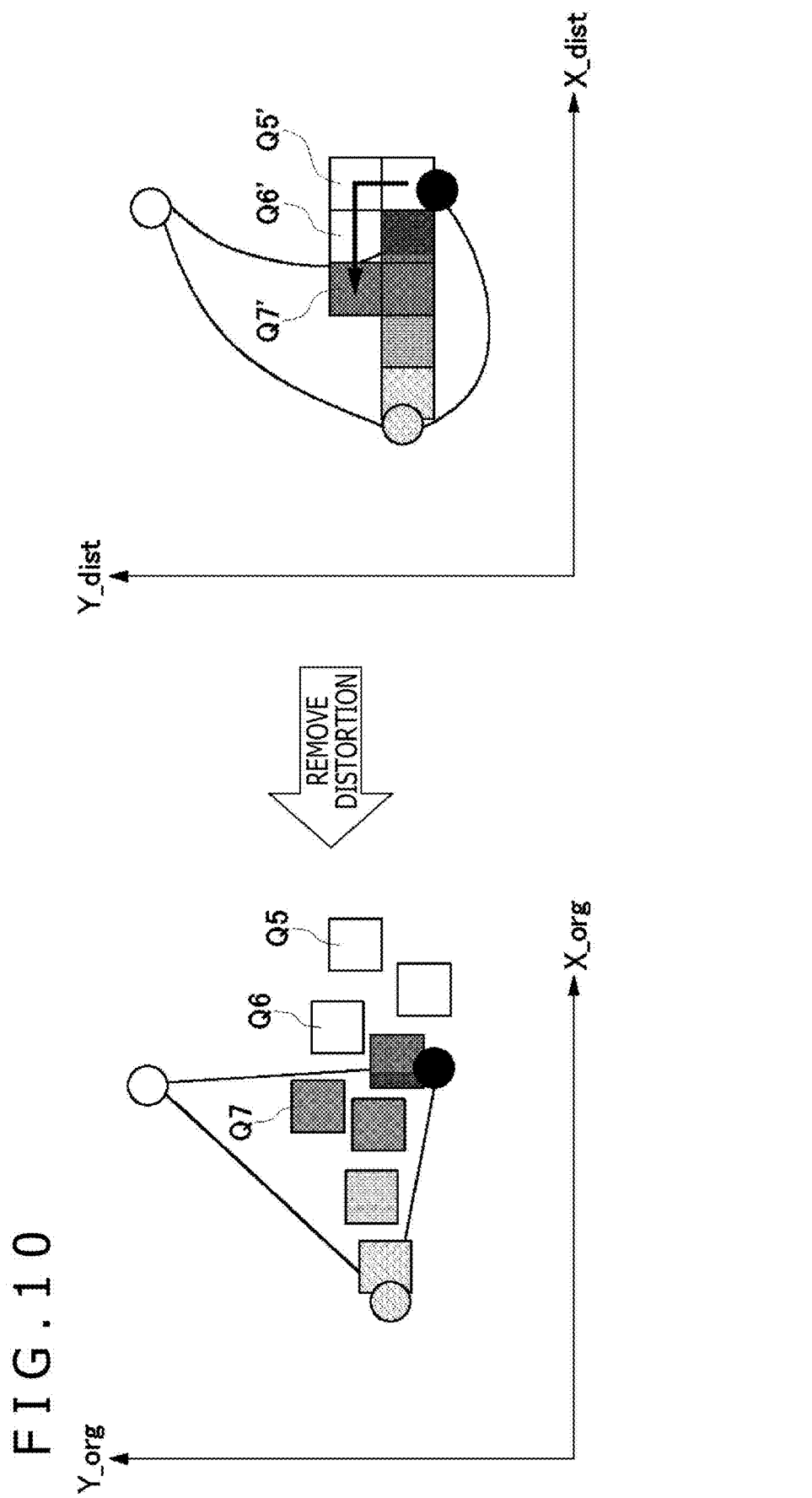

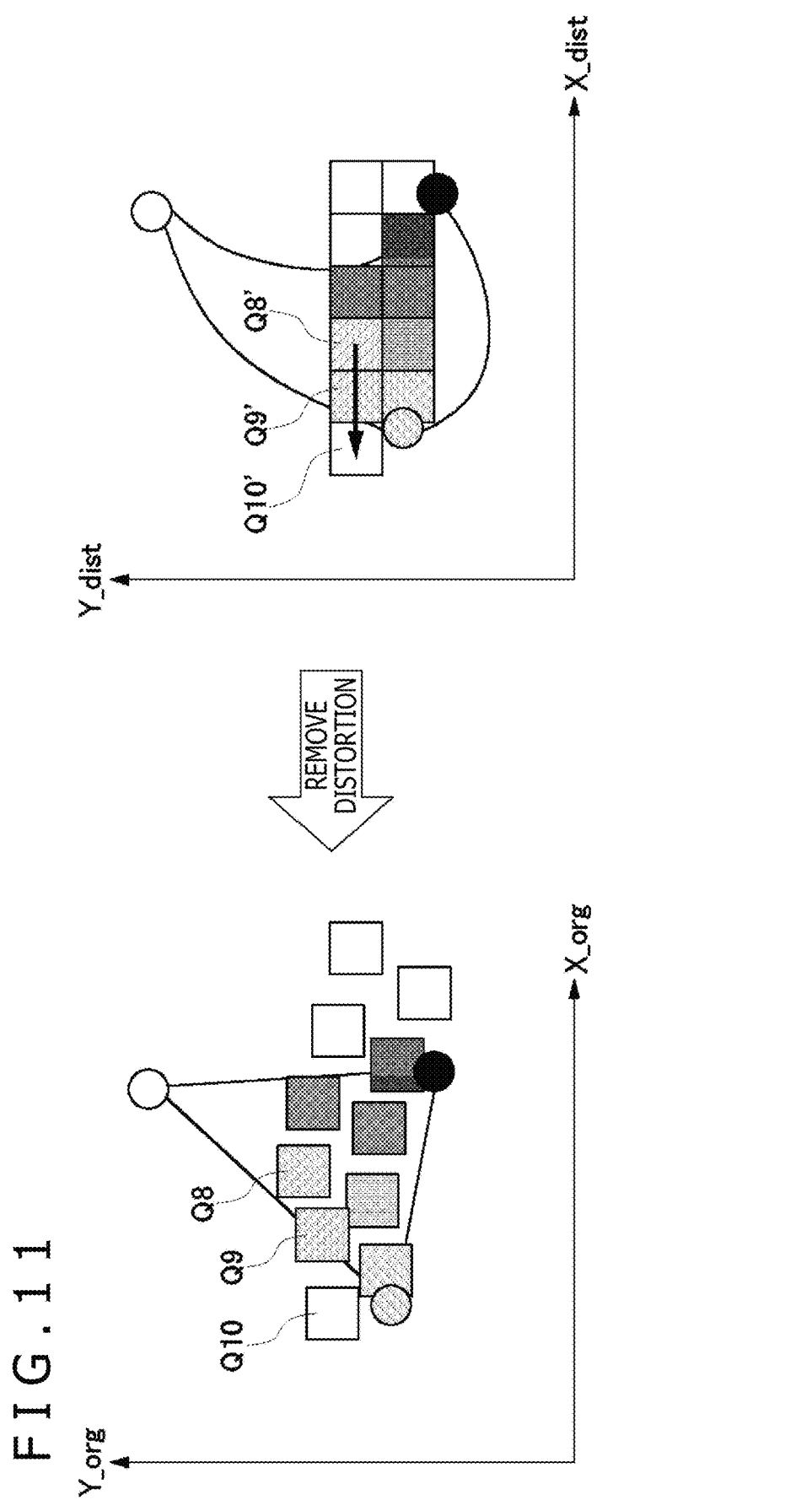

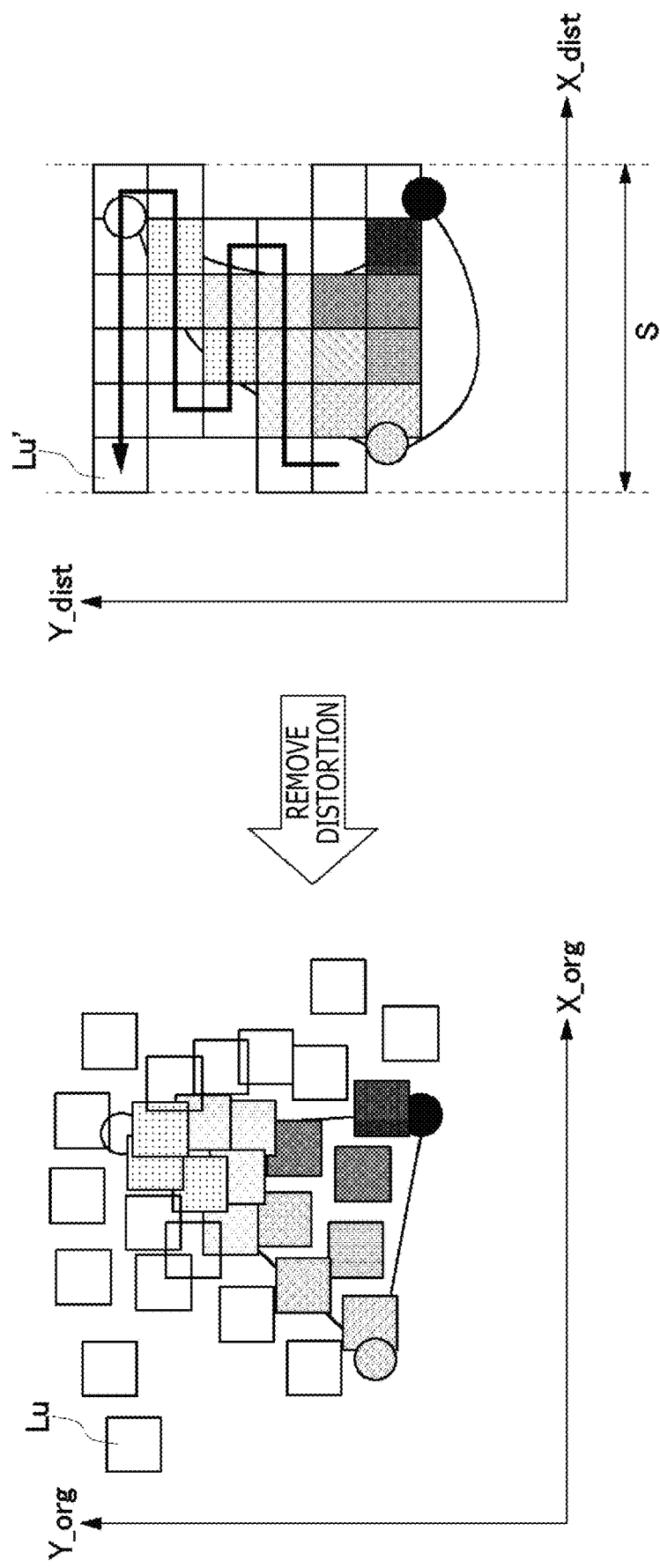

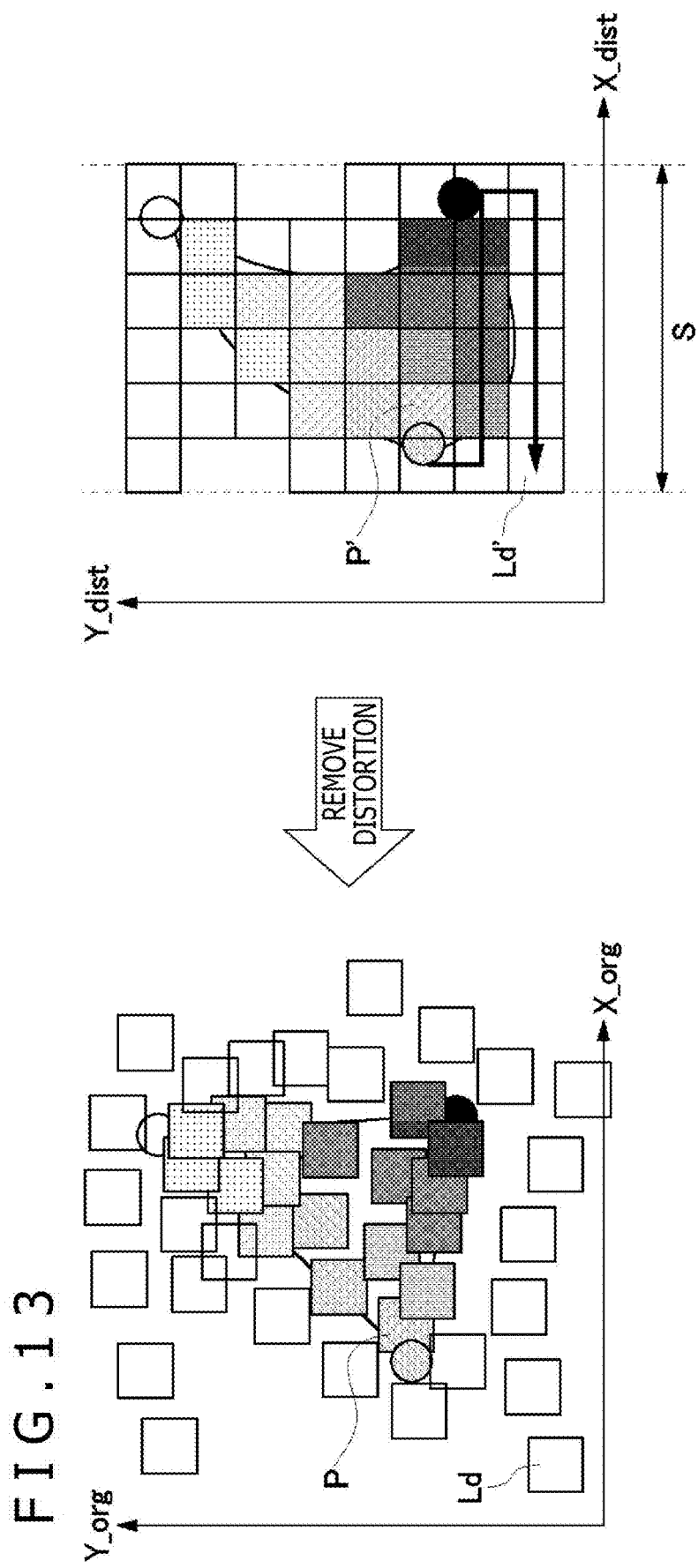

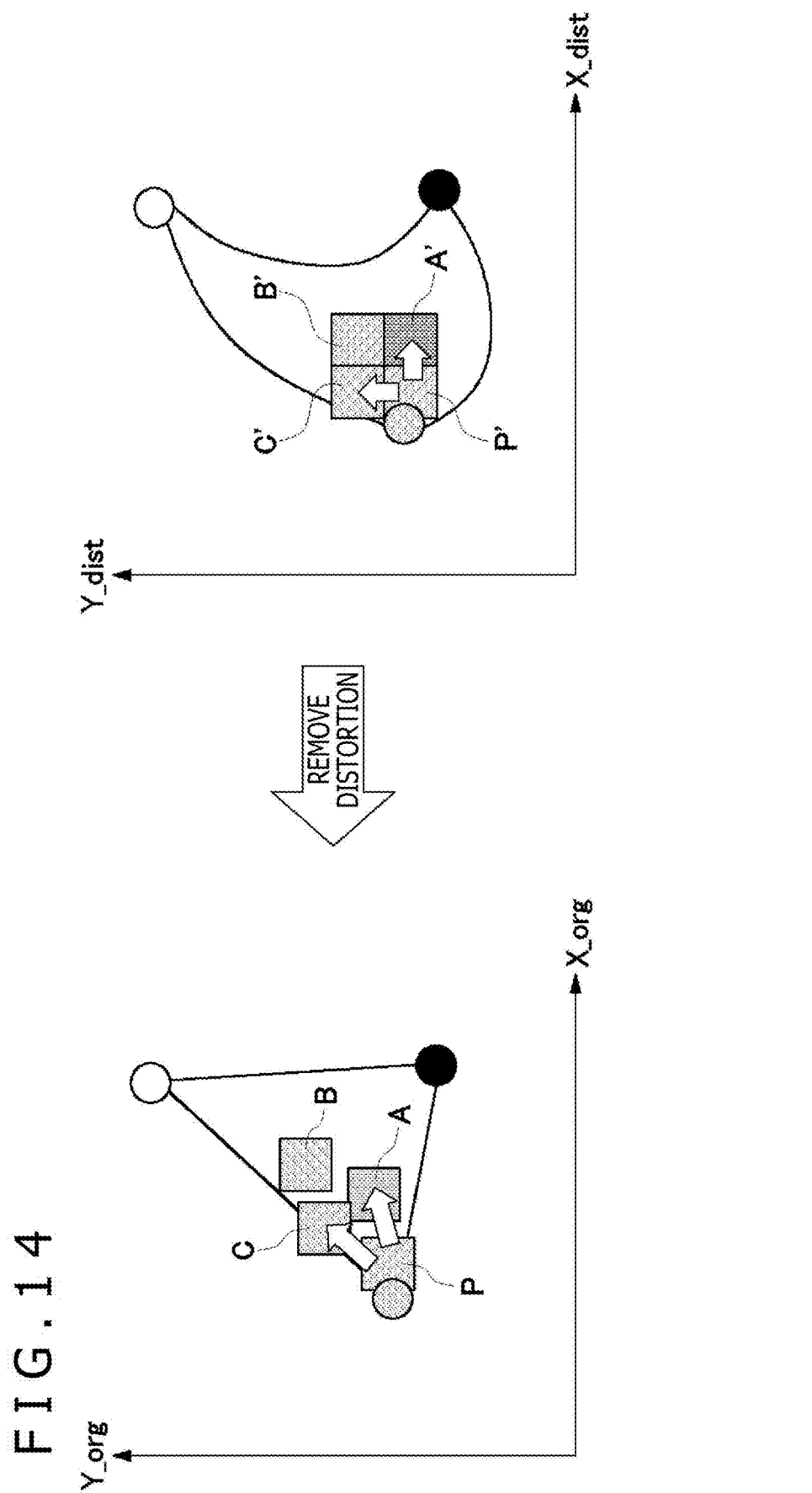

F I G . 1 5
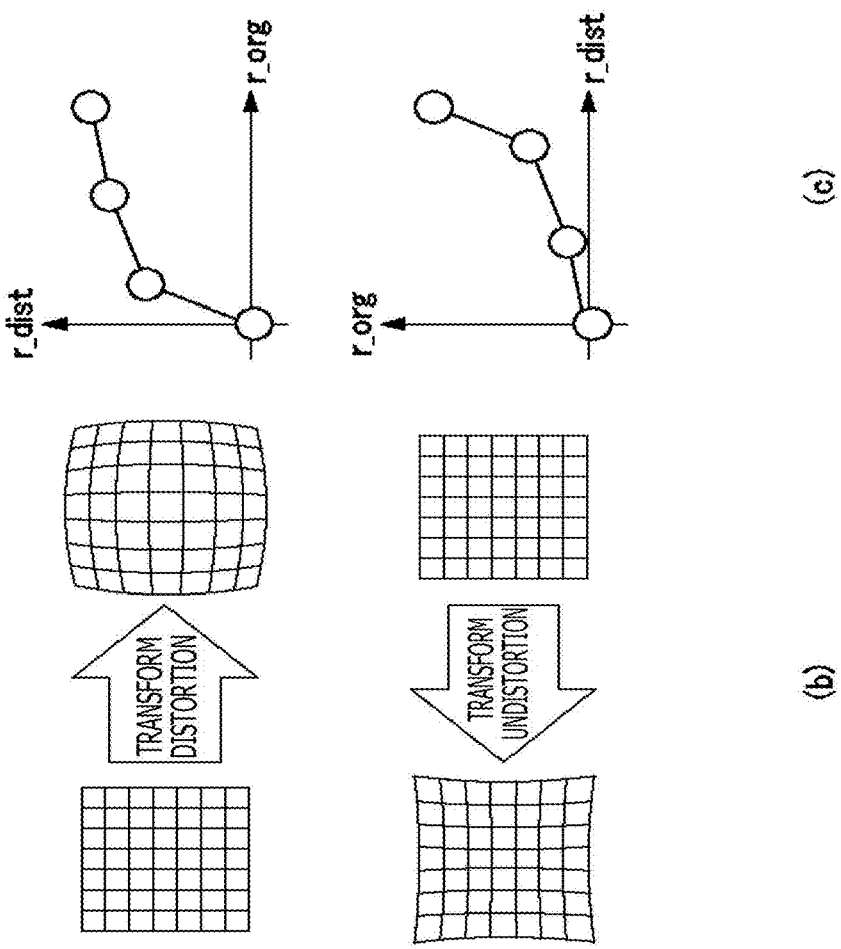

IMAGE GENERATION APPARATUS AND IMAGE GENERATION METHOD

TECHNICAL FIELD

The present invention relates to a technique for generating an image.

BACKGROUND ART

Systems with improved realistic sensations have been developed in which a three-dimensional video is displayed on a head-mounted display and in which a three-dimensional video corresponding to a line-of-sight direction is displayed when a user on which the head-mounted display is mounted rotates the head. Utilization of the head-mounted display allows enhancement of a sense of immersion into the video and improvement of operability of applications such as games.

The head-mounted display employs an optical lens with a high curvature to cause a video with a wide field of view to be displayed in front of and around the eyes of the user and is configured such that the user gazes into a display panel via the lens. However, the use of the high-curvature lens causes the video to be distorted due to distortion aberration. Thus, to allow the video to be correctly viewed through the high-curvature lens, the head-mounted display is configured as follows: distortion correction is performed on a rendered image in advance, the image subjected to the distortion correction is transmitted to the head-mounted display, and the image is displayed on the display panel and can be normally viewed by the user through the high-curvature lens.

SUMMARY

Technical Problems

To allow the distortion correction to be performed on the rendered image, the rendered image needs to be temporarily held in a frame buffer, and the image stored in the frame buffer needs to be subjected to the distortion correction, with the resultant image output. Thus, a memory capacity for saving a non-distorted image is required, and an excess amount of processing time is required for the distortion correction. For rendering processing in a mobile terminal and the like, the memory capacity is required to be reduced for power saving. Additionally, for ease of motion sickness due to the head-mounted display, there has been a demand for shortened rendering latency.

In view of such problems, an object of the present invention is to provide an image generation technique for enabling reduction of memory capacity or shortening of rendering latency.

Solution to Problems

To achieve the above-described problems, an image generation apparatus of an aspect of the present invention includes a distortion information storage section that stores, as distortion information, information for deforming and distorting an image and a distortion rendering section that renders a distorted image by rasterization processing using the distortion information without generating a non-distorted image in a memory.

Another aspect of the present invention is an image generation method. The method includes a distortion rendering step of reading, as distortion information, information for deforming and distorting an image and rendering a distorted image by rasterization processing using the distortion information without generating a non-distorted image in a memory.

Note that effective aspects of the present invention include any combination of the above-described components and transformation of the expression of the present invention among a method, an apparatus, a system, a computer program, a data structure, a recording medium, and the like.

Advantageous Effects of Invention

According to the present invention, the memory capacity can be reduced or rendering latency can be shortened.

BRIEF DESCRIPTION OF DRAWINGS

FIG. 6 is a flowchart depicting a procedure for the distortion rendering processing of the first embodiment.

FIG. 7 is a diagram illustrating processing for determining a rasterization start position in FIG. 6.

FIG. 8 is a diagram illustrating the processing for determining the rasterization start position in FIG. 6.

FIG. 9 is a diagram illustrating rasterization processing in an upward direction in FIG. 6.

FIG. 10 is a diagram illustrating the rasterization processing in the upward direction in FIG. 6.

FIG. 11 is a diagram illustrating the rasterization processing in the upward direction in FIG. 6.

FIG. 12 is a diagram illustrating the rasterization processing in the upward direction in FIG. 6.

FIG. 13 is a diagram illustrating rasterization processing in a downward direction in FIG. 6.

FIG. 14 is a diagram illustrating a method for calculating X and Y direction differential values for parameters in the distortion rendering processing.

FIGS. 15($a$) to 15($c$) are diagrams illustrating distortion transform and undistortion transform.

DESCRIPTION OF EMBODIMENTS

First Embodiment

Figure 1:
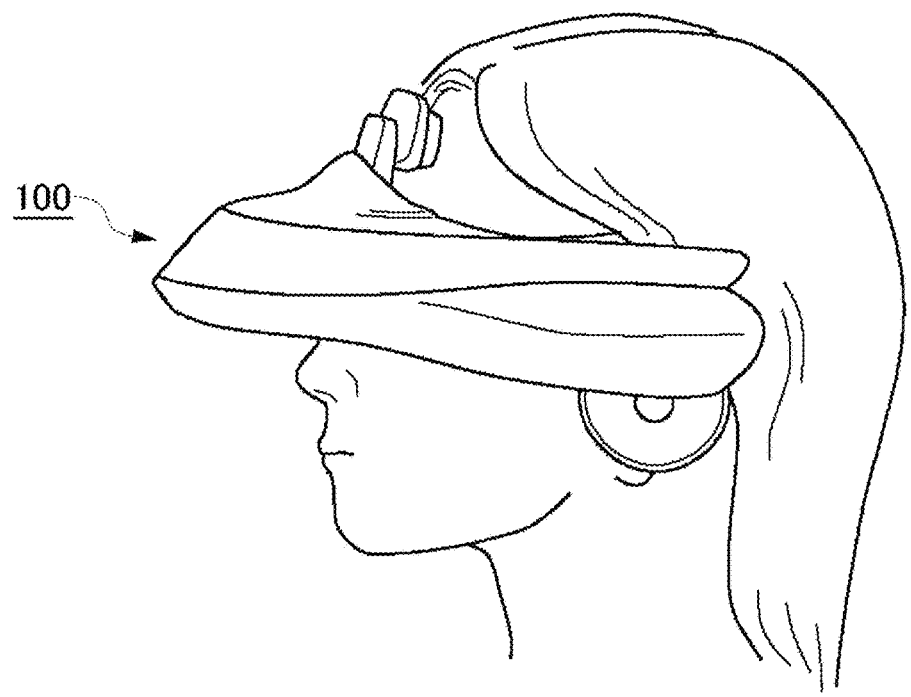
FIG. 1 is a diagram of appearance of a head-mounted display.

FIG. 1 is a diagram of appearance of a head-mounted display 100. The head-mounted display 100 is a display apparatus mounted on a head of a user to allow the user to view still images, moving images, and the like displayed on a display and to listen to voice, music, and the like output from headphones.

A gyro sensor, an acceleration sensor, and the like built in or externally installed on the head-mounted display 100 allow measurement of position information regarding the head of the user on which the head-mounted display 100 is mounted and orientation information such as a rotation angle and inclination of the head.

The head-mounted display 100 is an example of a "wearable display." A method for generating an image to be displayed on the head-mounted display 100 will be described herein. However, the image generation method of the present embodiment is not limited to the case of the head-mounted display 100 in a narrow sense and can be applied to cases where the user wears eyeglasses, an eyeglass type display, an eyeglass type camera, headphones, a headset (headphones with a microphone), an earphone, an earring, an ear camera, a cap, a cap with a camera, a hair band, or the like.

Figure 2:
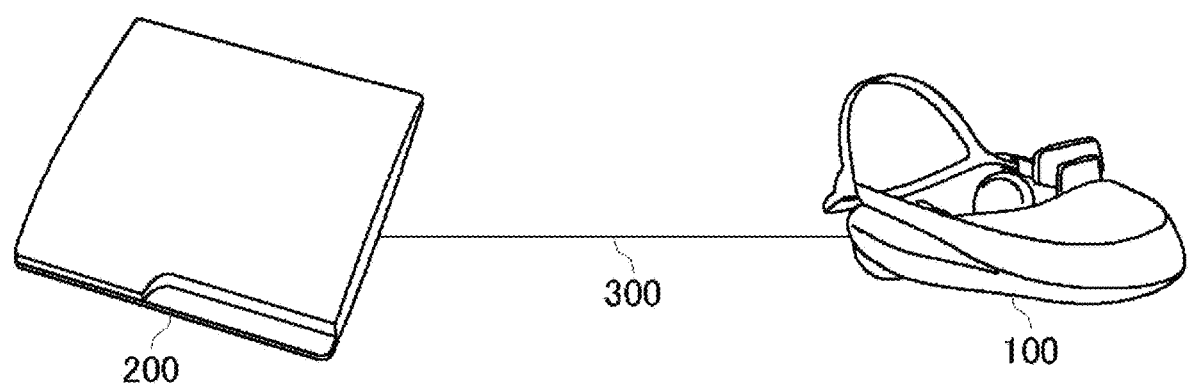
FIG. 2 is a configuration diagram of an image generation system according to a first embodiment.

FIG. 2 is a configuration diagram of an image generation system according to the present embodiment. As an example, the head-mounted display 100 is connected to an image generation apparatus 200 through an interface 300 such as the HDMI (registered trademark) (High-Definition Multimedia Interface) corresponding to standards for a communication interface transmitting video and sound by using digital signals.

The image generation apparatus 200 predicts position and orientation information regarding the head-mounted display 100, from current position and orientation information regarding the head-mounted display 100 taking into account a delay from generation until display of a video, and on the basis of the predicted position and orientation information regarding the head-mounted display 100, renders an image to be displayed on the head-mounted display 100. The image generation apparatus 200 then transmits the rendered image to the head-mounted display 100.

An example of the image generation apparatus 200 is a game machine. The image generation apparatus 200 may further be connected to a server via a network. In that case, the server may provide the image generation apparatus 200 with an online application such as a game in which a plurality of users can join via a network. The head-mounted display 100 may be connected to a computer or a portable terminal instead of the image generation apparatus 200.

Figure 3:
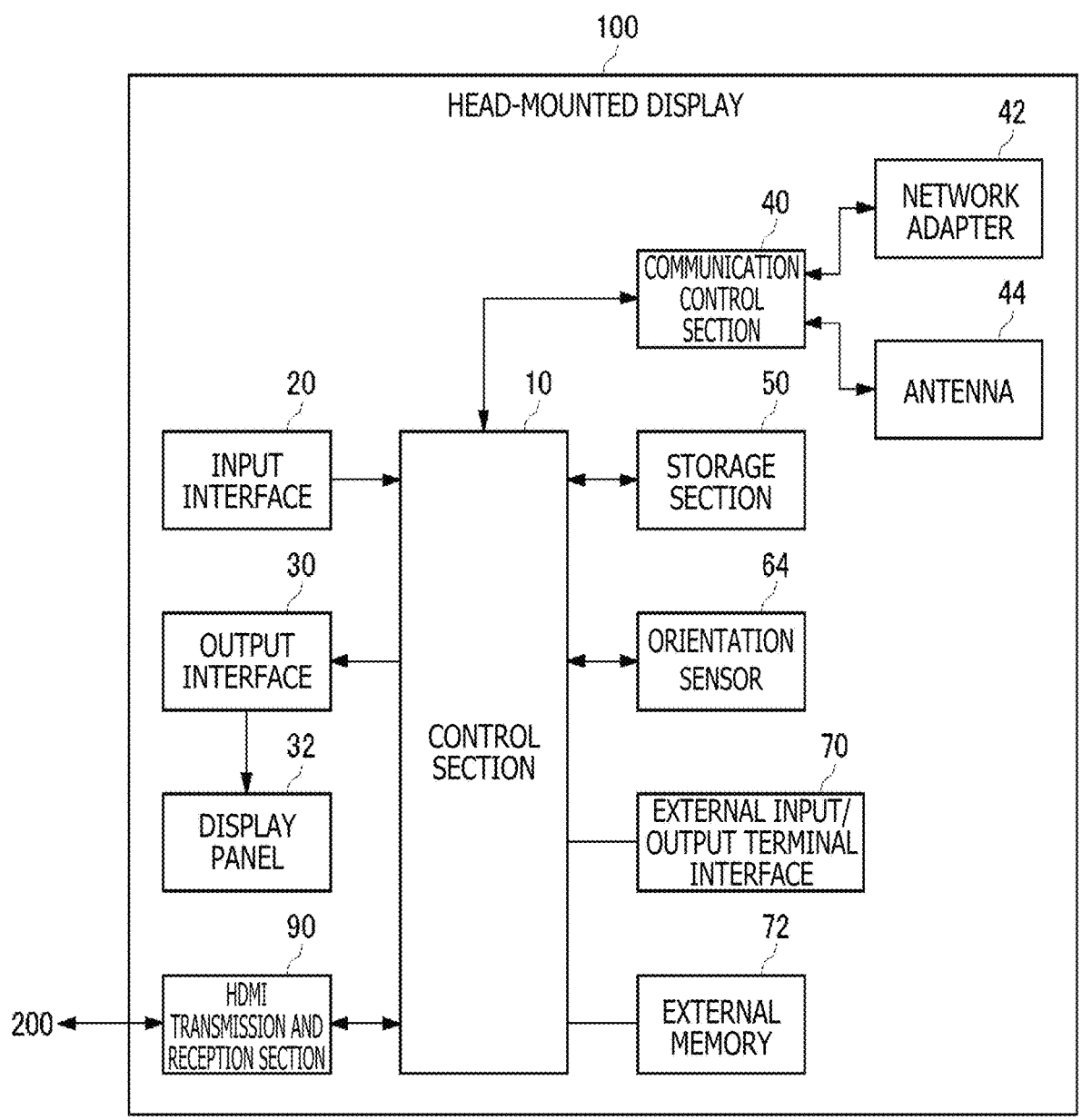
FIG. 3 is a functional configuration diagram of the head-mounted display.

FIG. 3 is a functional configuration diagram of the head-mounted display 100.

A control section 10 is a main processor processing and outputting signals such as image signals and sensor signals, and instructions and data. An input interface 20 receives operation signals and setting signals from a user and feeds the signals to the control section 10. An output interface 30 receives an image signal from the control section 10 and displays the image signal on a display panel 32.

By wired or wireless communication, a communication control section 40 transmits data input from the control section 10, to the outside via a network adapter 42 or an antenna 44. Additionally, by wired or wireless communication, the communication control section 40 receives data from the outside via the network adapter 42 or the antenna 44 and outputs the data to the control section 10.

A storage section 50 temporarily stores data, parameters, operation signals, and the like processed by the control section 10.

An orientation sensor 64 detects position information regarding the head-mounted display 100 and orientation information such as a rotation angle, inclination, and the like of the head-mounted display 100. The orientation sensor 64 is implemented by appropriately combining a gyro sensor, an acceleration sensor, an angular acceleration sensor, and the like. Front and backward, leftward and rightward, and upward and downward motion of the head of the user may be detected by using a motion sensor including a combination of one or more of a three-axis geomagnetic sensor, a three-axis acceleration sensor, and a three-axis gyroscope (angular velocity).

An external input/output terminal interface 70 is an interface to which peripheral equipment such as a USB (Universal Serial Bus) controller or the like is connected. An external memory 72 is an external memory such as a flash memory.

An HDMI transmission and reception section 90 transmits and receives digital signals for video and sound to and from the image generation apparatus 200 in accordance with the HDMI. The HDMI transmission and reception section 90 receives, through an HDMI transmission path from the image generation apparatus 200, an image generated by the image generation apparatus 200, and feeds the image to the control section 10.

The control section 10 can feed an image or text data to the output interface 30 to allow the output interface 30 to display the image or text data on the display panel 32, or feed the image or text data to the communication control section 40 to allow the communication control section 40 to transmit the image or text data to the outside.

The current position and orientation information regarding the head-mounted display 100 detected by the orientation sensor 64 is notified to the image generation apparatus 200 via the communication control section 40 or the external input/output terminal interface 70. Alternatively, the HDMI transmission and reception section 90 may transmit, to the image generation apparatus 200, the current position and orientation information regarding the head-mounted display 100.

Figure 4:
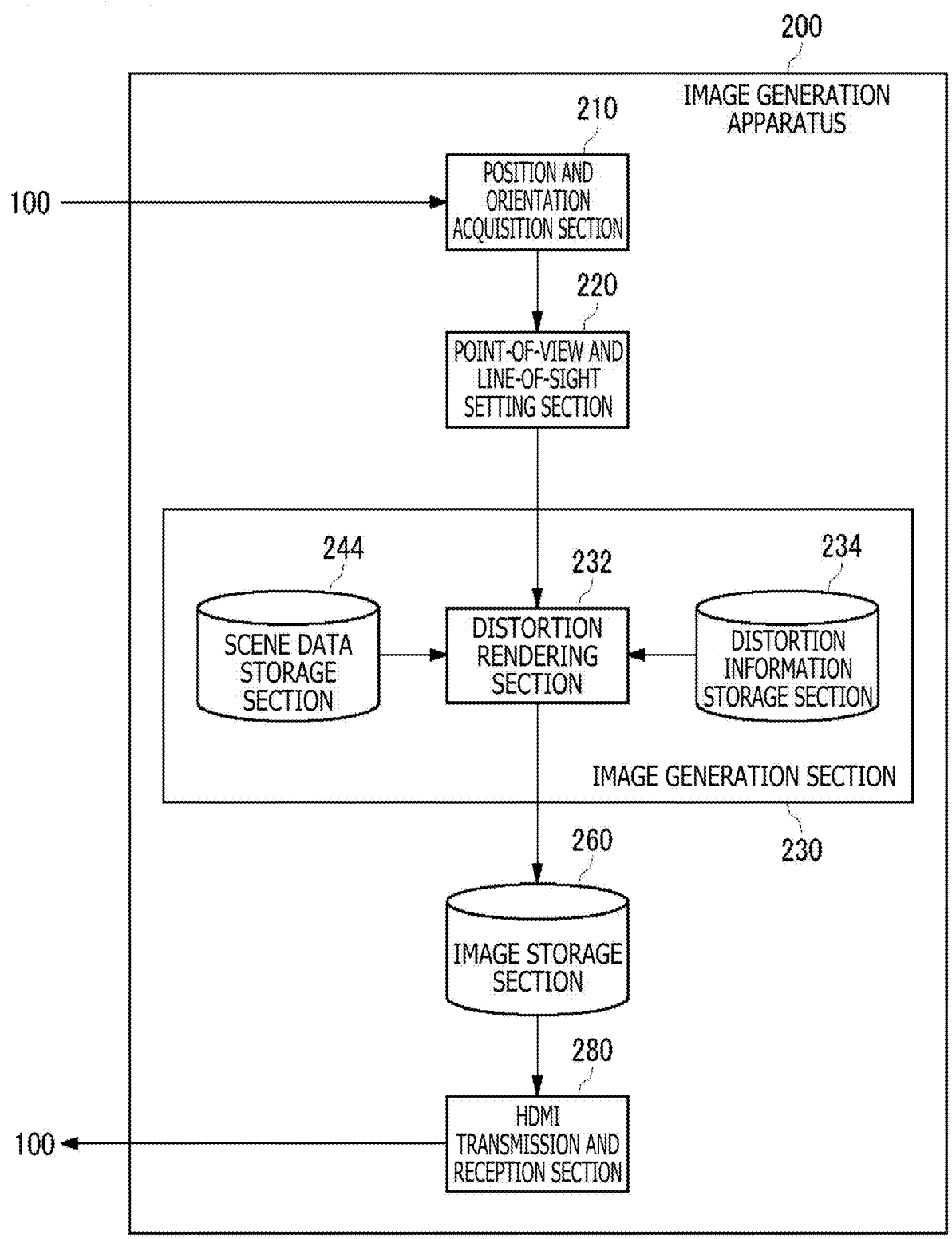
FIG. 4 is a functional configuration diagram of an image generation apparatus according to the first embodiment.

FIG. 4 is a functional configuration diagram of the image generation apparatus 200 according to the present embodiment. FIG. 4 is a block diagram focusing on functions, and the functional blocks can be implemented in various manners using only hardware or software or a combination of hardware and software.

At least some of the functions of the image generation apparatus 200 may be implemented in the head-mounted display 100. Alternatively, at least some of the functions of the image generation apparatus 200 may be implemented in a server connected to the image generation apparatus 200.

A position and orientation acquisition section 210 acquires the current position and orientation information regarding the head-mounted display 100 from the head-mounted display 100.

A point-of-view and line-of-sight setting section 220 sets a point-of-view position and a line-of-sight direction of the user by using the position and orientation information regarding the head-mounted display 100 acquired by the position and orientation acquisition section 210.

An image generation section 230 includes a distortion rendering section 232, a distortion information storage section 234, and a scene data storage section 244.

The distortion rendering section 232 reads out scene data from the scene data storage section 244, and according to the point-of-view position and line-of-sight direction of the user set by the point-of-view and line-of-sight setting section 220, renders an object in a virtual space viewed in the line-of-sight direction from the point-of-view position of the user with the head-mounted display 100 mounted thereon. During rendering, the distortion rendering section 232 simultaneously executes processing for reading out distortion information from the distortion information storage section 234 and deforming and distorting the image according to distortion caused by an optical system of the head-mounted display 100. Specifically, the distortion rendering section 232 directly renders a distorted image with reference to distortion information regarding the optical system of the head-mounted display 100, without generating a non-distorted image, and writes the rendered distorted image into a frame buffer of an image storage section 260. "Distortion rendering processing" refers to processing for directly rendering a distorted image in a frame buffer without generating a non-distorted image in an intermediate buffer as described above, and will be described below in detail.

An HDMI transmission and reception section 280 reads out, from the image storage section 260, frame data of an augmented reality image generated by the image generation section 230, and transmits the frame data to the head-mounted display 100 in accordance with the HDMI.

Figure 5:
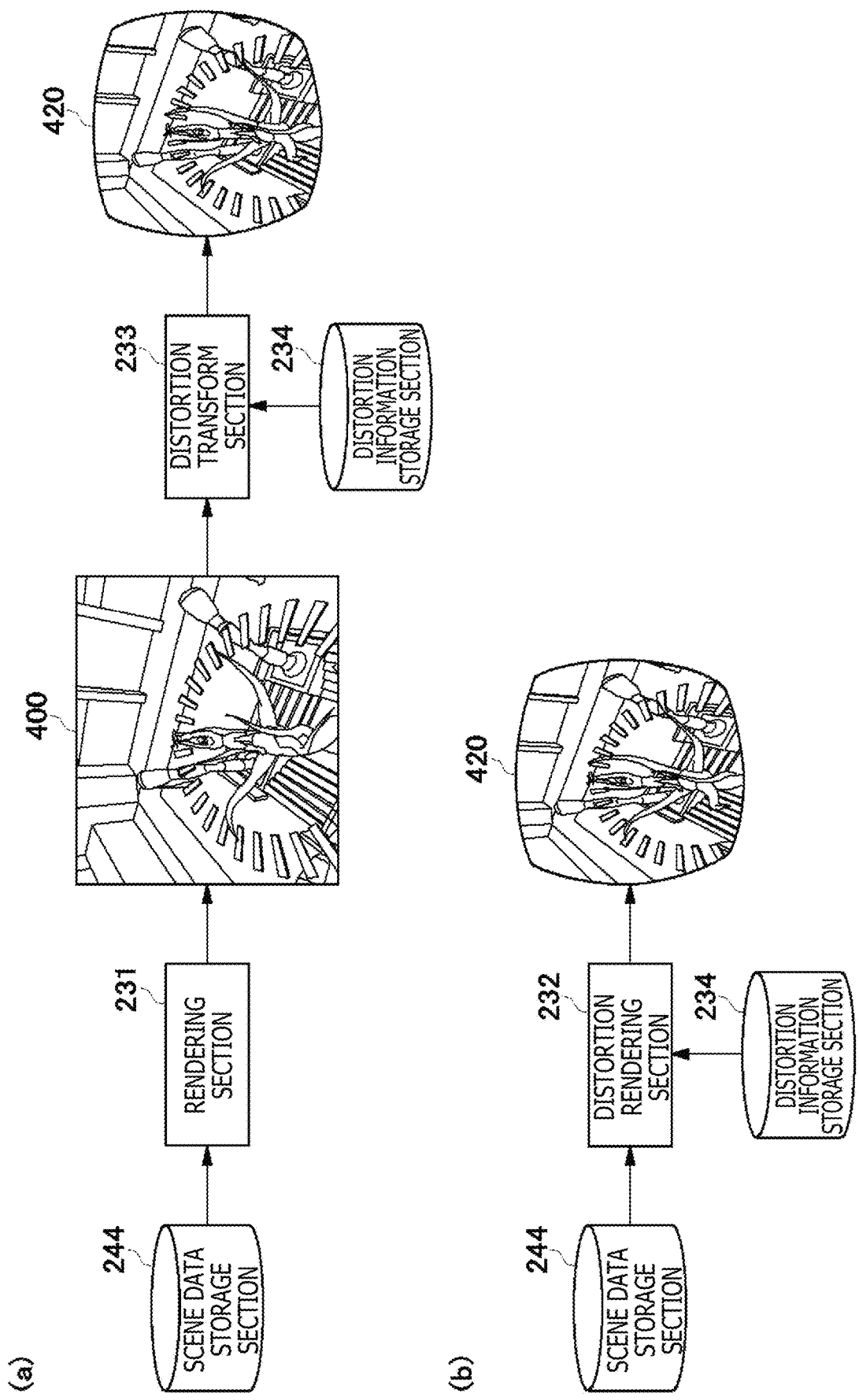
FIG. 5($a$) is a diagram illustrating known rendering processing, and FIG. 5($b$) is a diagram illustrating distortion rendering processing of the first embodiment.

FIG. 5(a) is a diagram illustrating known rendering processing, and FIG. 5(b) is a diagram illustrating distortion rendering processing of the present embodiment.

In the related art, in a case where a distorted image 420 is generated that is to be displayed on the display panel 32 of the head-mounted display 100, then as depicted in FIG. 5(a), a rendering section 231 reads out scene data from the scene data storage section 244 and renders a non-distorted image 400 in a frame buffer on the basis of the scene data, and then a distortion transform section 233 read out distortion information from the distortion information storage section 234 and distorts the non-distorted image 400 on the basis of the distortion information to generate a distorted image 420. The known rendering processing requires a memory in which the non-distorted image 400 is saved, and once the rendering is finished, distortion transform processing is executed, leading to an extra amount of processing time to increase rendering latency.

In the distortion rendering processing of the present embodiment, as depicted in FIG. 5(b), the distortion rendering section 232 initially distorts, on the basis of the distortion information stored in the distortion information storage section 234, a scene in a virtual space based on the scene data stored in the scene data storage section 244 to perform rendering, and writes the distorted image 420 into the frame buffer. The distortion rendering of the present embodiment enables a reduction in the memory capacity for saving a non-distorted image, and involves simultaneous execution of rendering and distortion transform processing, allowing the processing time and thus rendering latency to be shortened.

In a case where rendering processing is executed in an apparatus such as a mobile terminal which has a limited battery capacity, power saving is important, and the distortion rendering of the present embodiment generates no non-distorted image in the memory, leading to a reduced number of memory accesses and reduced power consumption. Additionally, in the head-mounted display 100, shortened rendering latency is important for improvement of user experience such as ease of motion sickness. The distortion rendering processing of the present embodiment involves execution of distortion transform during rendering, enabling a reduction in processing time and allowing images to be rendered with low latency.

FIG. 6 is a flowchart depicting a procedure for the distortion rendering of the present embodiment.

Normally, rasterization processing determines a rasterization range by using coordinates of three vertices of a triangle to be processed. However, when the triangle is subjected to distortion transform on the basis of the distortion information, the rasterization range fails to be determined by using only the coordinates of the three vertices of the distorted triangle in a case where the distortion is non-linear. Thus, rasterization is continued upward and downward from a rasterization start position in the distorted triangle until the pixel to be processed is out of the triangle.

The distortion rendering section 232 determines the rasterization start position by using coordinates resulting from application of distortion (S10). The distortion rendering section 232 performs rasterization upward from the rasterization start position (S20). When the upward rasterization ends, the distortion rendering section 232 then performs rasterization upward from the rasterization start position (S30).

FIG. 7 and FIG. 8 are diagrams describing the processing S10 for determining the rasterization start position in FIG. 6.

FIG. 7 is a diagram illustrating a method for determining the rasterization start position. As depicted in FIG. 7, a triangle 310 for rasterization processing in a coordinate system X_org-Y_org before application of distortion becomes a distorted triangle 312 in a coordinate system X_dist-Y_dist after application of distortion. Three vertices v0, v1, and v2 of the triangle 310 before application of distortion move to three vertices v0', v1', and v2' of the triangle 312 after application of distortion. When a distortion function is denoted by dist, the three vertices v0', v1', and v2' of the distorted triangle 312 are given by the equations below.

$v0'=\text{dist}(v0)$ $v1'=\text{dist}(v1)$ $v2'=\text{dist}(v2)$

A vertex with the smallest X coordinate is selected from the distorted triangle 312. In the example in FIG. 7, the vertex v2' with the smallest X coordinate Y is selected. Coordinate values of the vertex v2' are generally not integer values, and thus a pixel closest to the vertex v2', that is, a point P' having an X coordinate closest to the vertex v2' and being an integer and a Y coordinate also closest to the vertex v2' and being an integer, is selected as the rasterization start position.

FIG. 8 is a diagram illustrating a method for generating a rasterization start pixel. Coordinates of the rasterization start pixel P' before application of distortion in the coordinate system after application of distortion are determined. undist, which is an inverse function of a distortion function dist, is used to determine a rasterization start pixel P before application of distortion in accordance with the equation below.

$$P=\text{undist}(P')$$

For the determined rasterization start pixel P before application of distortion, triangle inside/outside determination and parameter generation are performed. For example, a barycentric coordinate system is utilized to determine a value of the rasterization start pixel P on the basis of a linear sum of values of the three vertices v0, v1, and v2 of the triangle.

A pixel value of the rasterization start pixel P' after application of distortion is set using the pixel value of the rasterization start pixel P before application of distortion. The rasterization start pixel P' after application of distortion is thus generated, ending the processing S10 for determining the rasterization start position.

FIGS. 9 to 12 are diagrams illustrating upward rasterization processing S20 in FIG. 6.

As depicted in FIG. 9, in the coordinate system X_dist-Y_dist after application of distortion, pixels Q1', Q2', Q3', and Q4' are processed with a pixel to be processed moved rightward on a pixel-by-pixel basis starting at the rasterization start pixel P'. When an undistortion function undist is applied to remove distortion, the pixels Q1', Q2', Q3', and Q4' after application of distortion are respectively transformed into pixels Q1, Q2, Q3, and Q4 before application of distortion. Triangle inside/outside determination and parameter generation are performed on the pixels Q1, Q2, Q3, and Q4 before application of distortion. The pixels Q1, Q2, and Q3 before application of distortion are inside the triangle, and thus the barycentric coordinate system or the like is utilized to determine the values of the pixels Q1, Q2, and Q3 before application of distortion on the basis of the linear sum of the values of the three vertices v0, v1, and v2 of the triangle. The values of the pixels Q1', Q2', and Q3' after application of distortion are set to the determined values. The pixel Q4 before application of distortion is outside the triangle, and thus the pixel Q4' after application of distortion is not generated, and rightward movement in the coordinate system X_dist-Y_dist after application of distortion ends.

As depicted in FIG. 10, in the coordinate system X_dist-Y_dist after application of distortion, the pixel to be processed is moved one pixel upward from the pixel Q4', at which rightward movement has ended, and then pixels Q5', Q6', and Q7' are processed, with the pixel to be processed moved leftward on a pixel-by-pixel basis starting at the pixel Q5'. Rasterization is resumed with a pixel placed first inside the triangle before application of distortion. However, in a case where the first pixel Q5' after upward one-pixel movement from the pixel Q4', where rightward movement has ended, is already inside the triangle before application of distortion, the pixel to be processed needs to be moved rightward until the pixel to be processed is outside the triangle, before the pixel to be processed is moved leftward on a pixel-by-pixel basis.

In the example in FIG. 10, when the undistortion function undist is applied to remove distortion, pixels Q5', Q6', and Q7' after application of distortion are respectively transformed into pixels Q5, Q6, and Q7 before application of distortion. The pixels Q5 and Q6 before application of distortion are outside the triangle, whereas the pixel Q7 before application of distortion is inside the triangle. Consequently, rasterization is resumed with the pixel Q7' after application of distortion.

As depicted in FIG. 11, in the coordinate system X_dist-Y_dist after application of distortion, pixels Q8', Q9', and Q10' are processed, with the pixel to be processed is moved leftward on a pixel-by-pixel basis starting at the rasterization resumption pixel Q7'. When the undistortion function undist is applied to remove distortion, the pixels Q8', Q9', and Q10' after application of distortion are respectively transformed into pixels Q8, Q9, and Q10 before application of distortion. The pixels Q8 and Q9 before application of distortion are inside the triangle, and thus values of the pixels Q8 and Q9 before application of distortion are determined from the values of the three vertexes v0, v1, and v2 of the triangle, and values of the pixels Q8' and Q9' after application of distortion are set to the determined values. The pixel Q10 before application of distortion is outside the triangle, and thus the pixel Q10' after application of distortion is not generated, and the leftward movement in the coordinate system X_dist-Y_dist after application of distortion ends.

Subsequently, the pixels are scanned upward on a line-by-line basis for rasterization as depicted in FIG. 12. When the rasterization resumption pixel in a new line is searched for, the scan is ended in a case where the pixel to be processed fails to be inside the triangle even when the pixel to be processed is moved to an end of an X coordinate range S scanned heretofore. In the example in FIG. 12, the upward rasterization processing is ended at a last pixel Lu'.

FIG. 13 illustrates the downward rasterization processing S30 in FIG. 6. As is the case with the upward rasterization processing S20, in the coordinate system X_dist-Y_dist after application of distortion, the pixel to be processed is moved leftward on a pixel-by-pixel basis starting at the rasterization start pixel P' with the pixels inside the triangle rasterized, and once the pixel to be processed is outside the triangle, the pixel to be processed is moved one pixel downward and then rightward on a pixel-by-pixel basis, with the pixels inside the triangle rasterized. Subsequently, the pixels are rasterized with the pixel to be processed moved downward on a line-by-line basis, and the downward rasterization processing ends at a last pixel Ld' in a case where the pixel to be processed fails to be inside the triangle even when the pixel to be processed is moved to the end of the X coordinate range S scanned heretofore as is the case with the upward rasterization processing S20.

FIG. 14 is a diagram illustrating a method for calculating X and Y direction differential values for parameters in the distortion rendering processing. During rendering, X and Y direction differential values for pixel parameters may be needed, for example, in a case where a mipmap is used.

As depicted in FIG. 14, when the undistortion function undist is applied to remove distortion from the pixel P' and adjacent pixels A', B', and C' in the coordinate system X_dist-Y_dist after application of distortion, the pixel P' and the adjacent pixels A', B', and C' are respectively transformed into pixels P, A, B, and C in the coordinate system X_org-Y_org before application of distortion.

An X direction differential value dp/dx for the parameter for the pixel P' is calculated on the basis of a difference between the pixel P' and the adjacent pixel A'. The value of the pixel P' is obtained by rasterizing the pixel P before application of distortion, and the value of the adjacent pixel A' is obtained by rasterizing the pixel A before application of distortion. Similarly, a Y direction differential value dp/dy for the parameter for the pixel P' is calculated on the basis of a difference between the pixel P' and the adjacent pixel C'. The value of the pixel P' is obtained by rasterizing the pixel P before application of distortion, and the value of the adjacent pixel C' is obtained by rasterizing the pixel A before application of distortion.

Thus, rasterization is performed in units of 2×2 pixels, and the value for the pixel is calculated and the difference value between the pixel and each of the pixels adjacent in the horizontal direction and vertical direction is also calculated. The difference values in the horizontal and vertical directions are also used as differential values in the X and Y directions in units of 2×2 pixels. Alternatively, parameter values for the current line and the lines adjacent to and above and below the current line may be held in a line buffer, and the difference between the pixels in the X and Y directions may be determined.

FIGS. 15(a) to 15(c) are diagrams illustrating distortion transform and undistortion transform. The distortion transform function dist and the undistortion transform function undist can be given in polynomials as depicted in FIG. 15(a). The distortion transform and the undistortion transform may be defined by mesh approximation as depicted in FIG. 15(b). An optional point can be subjected to distortion transform and undistortion transform by interpolation from a neighborhood mesh vertex. As depicted in FIG. 15(c), values may be obtained by performing distortion transform and undistortion transform on a distance r from a distortion center and held in a table form, and with reference to the table, an optional point may be subjected to approximate distortion transform and undistortion transform.

As described above, in the distortion rendering processing by the image generation apparatus 200 of the present embodiment involves direct rendering of a distorted image in the frame buffer instead of rendering a non-distorted image in the frame buffer and then executing distortion transform processing on the non-distorted image to generate a distorted image. No non-distorted image is generated in the intermediate buffer, thus enabling a reduction in memory capacity and in power consumption required for memory access. Additionally, rendering and distortion processing are simultaneously executed, thus allowing the processing time and thus rendering latency to be shortened.

Second Embodiment

The distortion rendering processing of the first embodiment described above can be applied to foveated rendering. In the foveated rendering, a gaze region including the gaze point of the field of view of the user is rendered at a higher resolution than the other regions. By dynamically switching, depending on the gaze point, the distortion information utilized in the first embodiment, a distorted image corresponding to the gaze point can be generated.

Figure 16:
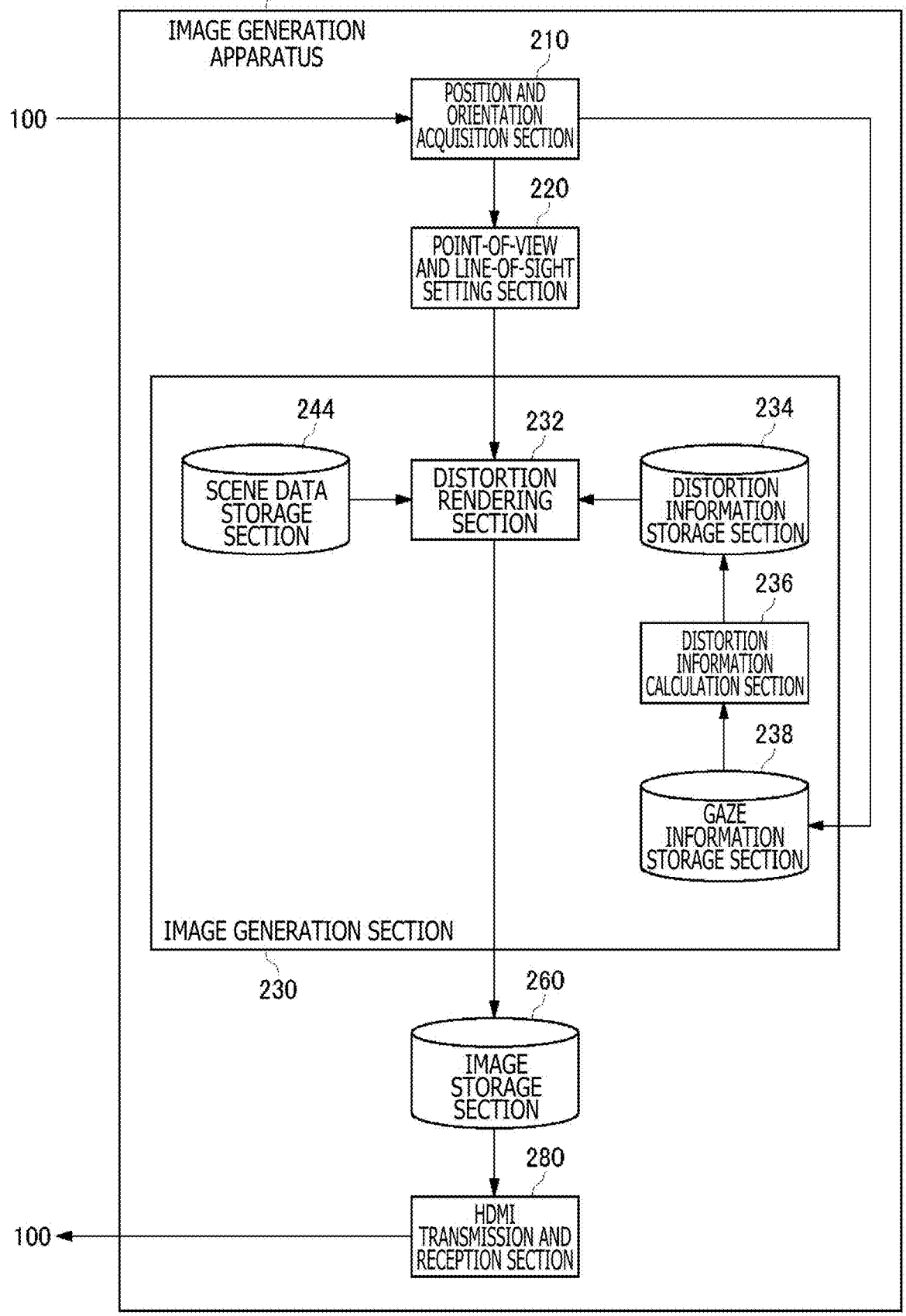
FIG. 16 is a configuration diagram of an image generation apparatus according to a second embodiment.

FIG. 16 is a configuration diagram of the image generation apparatus 200 according to a second embodiment. Components and operations different from the components and operations of the image generation apparatus 200 of the first embodiment will be described, description of common components and operations omitted.

The position and orientation acquisition section 210 acquires information regarding the gaze point of the user from the head-mounted display 100 and stores the information in a gaze information storage section 238 as gaze information. The gaze information includes, besides position information regarding the gaze point, scale information indicative of the rate at which the resolution of the gaze region including the gaze point is increased with respect to the resolution of non-gaze regions.

A distortion information calculation section 236 calculates "gaze distortion information" obtained by deforming distortion information with reference to the gaze information and taking into account the ratio of the resolution of the gaze region to the resolution of the non-gaze regions, and stores the calculated "gaze distortion information" in the distortion information storage section 234. The distortion rendering section 232 reads out the gaze distortion information from the distortion information storage section 234, renders a distorted image on the basis of the gaze distortion information, and stores the rendered distorted image in the image storage section 260.

The gaze point of the user varies dynamically, and when the position and orientation acquisition section 210 acquires information regarding a new gaze point of the user from the head-mounted display 100, new gaze information is stored in the gaze information storage section 238, and the distortion information calculation section 236 deforms the distortion information with reference to the new gaze information and stores new gaze distortion information in the distortion information storage section 234. The distortion rendering section 232 renders the distorted image on the basis of the new gaze distortion information.

Figure 17:
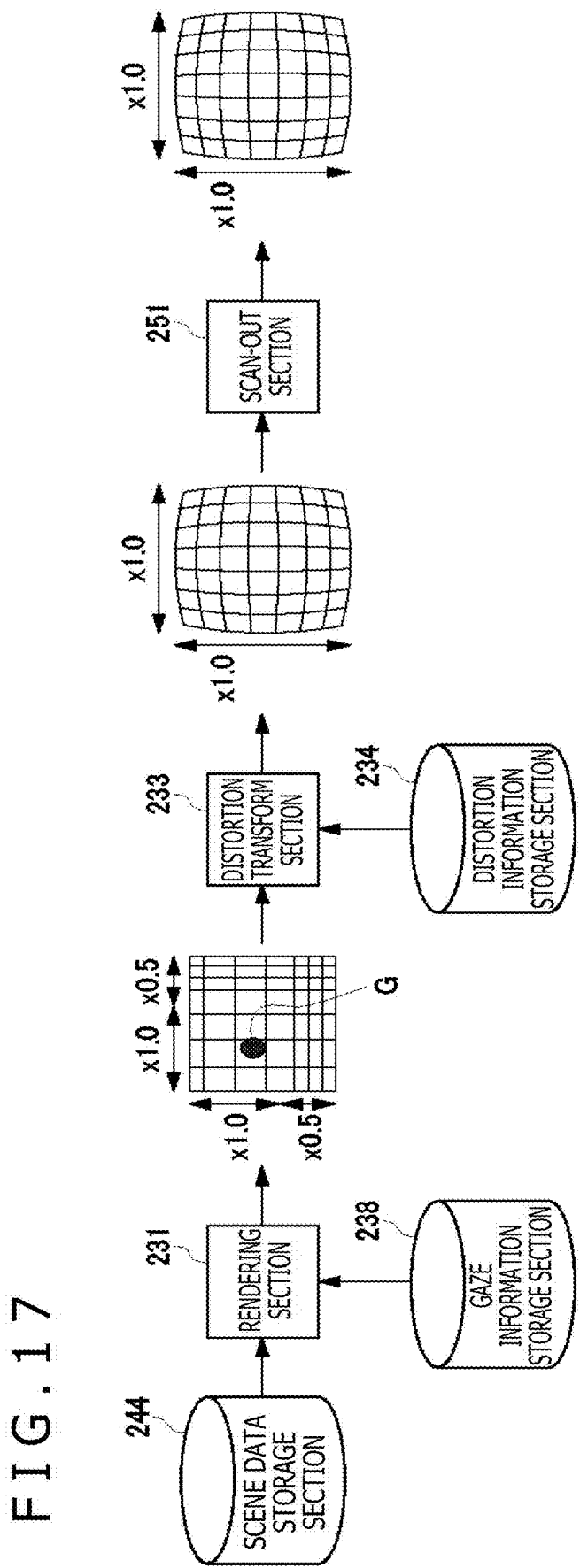
FIG. 17 is a diagram illustrating known rendering processing.

FIG. 17 is a diagram illustrating known rendering processing. The rendering section 231 reads out scene data from the scene data storage section 244, reads out the gaze information from the gaze information storage section 238, renders an image with an increased resolution in a gaze region including a gaze point G, and writes the image into the frame buffer. In this case, the gaze region including the gaze point G is not scaled up or down, whereas non-gaze regions are scaled down by a factor of 0.5. The non-gaze regions have fewer pixels than the gaze region, reducing rasterization loads, whereas the gaze region has more pixels, leading to high image quality.

The distortion transform section 233 reads out the distortion information from the distortion information storage section 234 and distorts the rendered image. During the distortion transform processing, the non-gaze regions with a resolution factor of 0.5 are scaled up by a factor of 2 for sampling to generate an unmagnified image, which is saved in the memory. A scan-out section 251 outputs the unmagnified image to the display panel 32.

Figure 18:
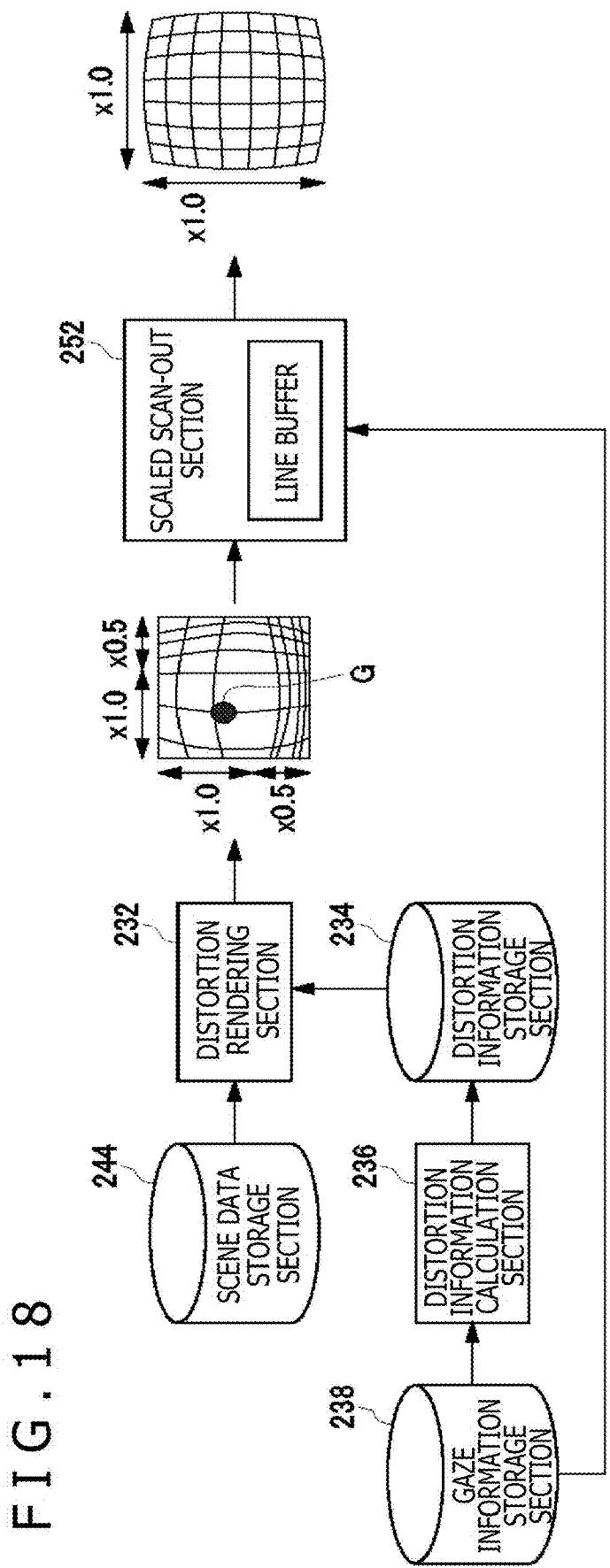
FIG. 18 is a diagram describing distortion rendering processing of the second embodiment.

FIG. 18 is a diagram illustrating the distortion rendering processing of the present embodiment. The distortion information calculation section 236 deforms the distortion information on the basis of the gaze information read out from the gaze information storage section 238 to calculate gaze distortion information, and saves the gaze distortion information in the distortion information storage section 234. The distortion rendering section 232 reads out scene data from the scene data storage section 244, reads out gaze distortion information from the distortion information storage section 234, and renders an image distorted using the gaze distortion information. In this case, in the frame buffer, a distorted image is generated in which the gaze region including the gaze point G is not scaled up or down, whereas the non-gaze regions are scaled down by a factor of 0.5.

A scaled scan-out section 252 reads out the gaze information from the gaze information storage section 238, buffers at least two lines of image in the line buffer, performs scaling of the image according to scaling information included in the gaze information, and outputs an unmagnified image. In this case, regions with a resolution factor of 0.5 are scaled up by a factor of 2 for sampling. For example, bilinear interpolation requires two lines of line buffer. Scaling is performed during scan-out, thus eliminating a need to develop the unmagnified image in the memory as in the known rendering processing in FIG. 17. This enables a reduction in memory capacity. Additionally, rendering and distortion processing are simultaneously executed, thus allowing the processing time to be shortened.

Note that in this case, for convenience of description, a configuration will be described in which the configuration of the image generation section 230 is provided in the head-mounted display 100 and in which images in the frame buffer are scanned out on the display panel 32. In this case, the scaled scan-out section 252 is implemented in the output interface 30, and an image is output to the display panel 32. Even in a case where the configuration of the image generation section 230 is provided in the image generation apparatus 200 as depicted in FIG. 4, an image read out from the image storage section 260 is transmitted to the head-mounted display 100 by the HDMI transmission and reception section 280, and the scaled scan-out section 252 implemented in the output interface 30 of the head-mounted display 100 outputs an image to the display panel 32.

Figure 19:
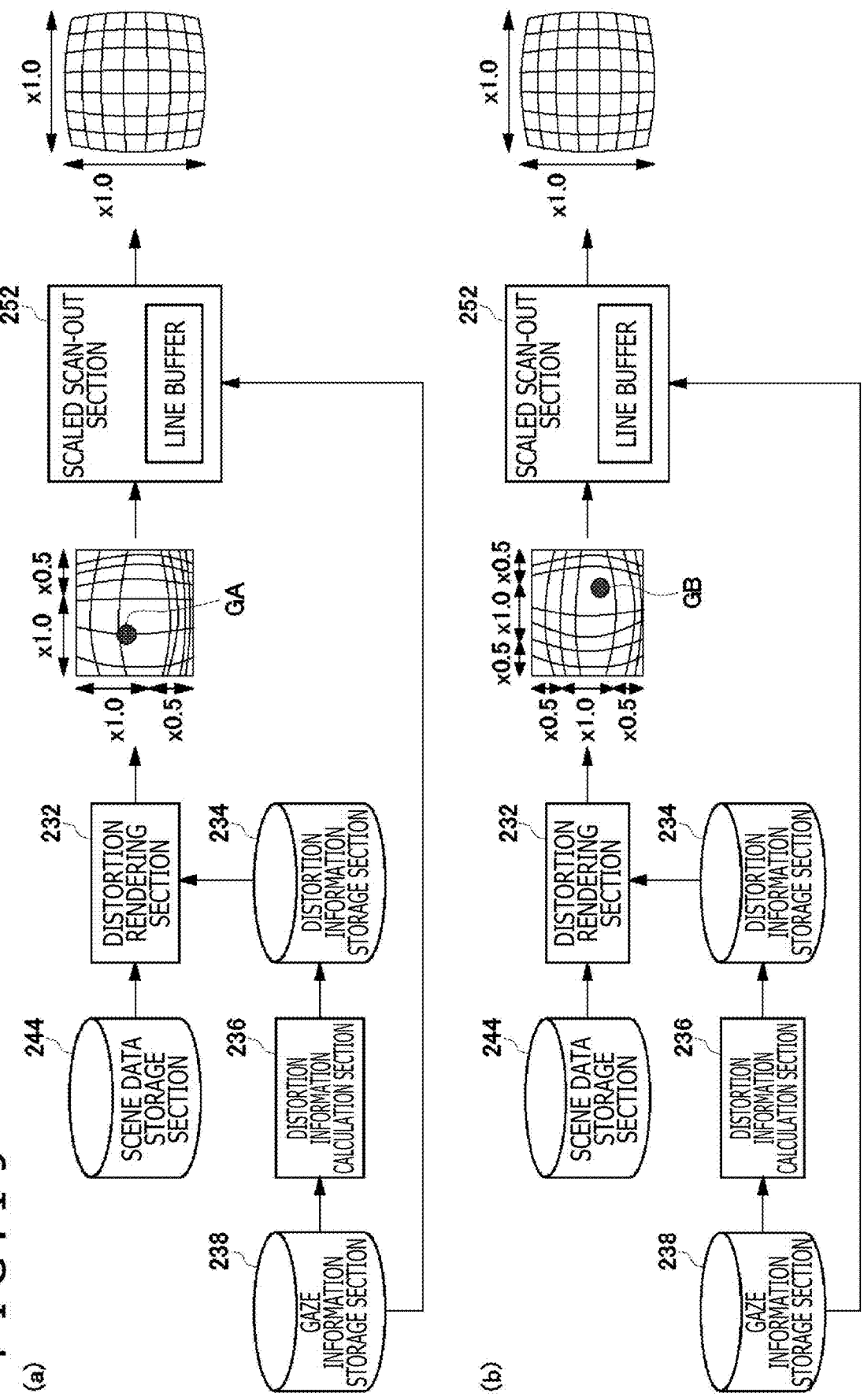
FIGS. 19($a$) and 19($b$) are diagrams illustrating distortion rendering processing for a case where a gaze point varies dynamically.

FIGS. 19(a) and 19(b) are diagrams illustrating distortion rendering processing for a case where the gaze point varies dynamically.

In FIG. 19(a), on the basis of information regarding a gaze point GA, the distortion information calculation section 236 calculates gaze distortion information A, and the distortion rendering section 232 generates a gaze distorted image on the basis of the gaze distortion information A. A gaze distorted image is generated in which a gaze region including an upper left gaze point GA is unmagnified, whereas non-gaze regions are scaled down by a factor of 0.5. The scaled scan-out section 252 scales the non-gaze regions up by a factor of 2 for sampling on the basis of the scaling information, and outputs a resultant image.

In FIG. 19(b), on the basis of information regarding a gaze point GB, the distortion information calculation section 236 calculates gaze distortion information B, and the distortion rendering section 232 generates a gaze distorted image on the basis of the gaze distortion information B. A gaze distorted image is generated in which a gaze region including a lower right gaze point GB is unmagnified, whereas non-gaze regions are scaled down by a factor of 0.5. The gaze region including the gaze point GB is set being narrower than the gaze region including the gaze point GA in FIG. 19(a). The setting of the scaling between the gaze region and the non-gaze regions is optional. The scaled scan-out section 252 scales up the non-gaze regions by a factor of 2 for sampling on the basis of the scaling information, and outputs a resultant image.

Figure 20:
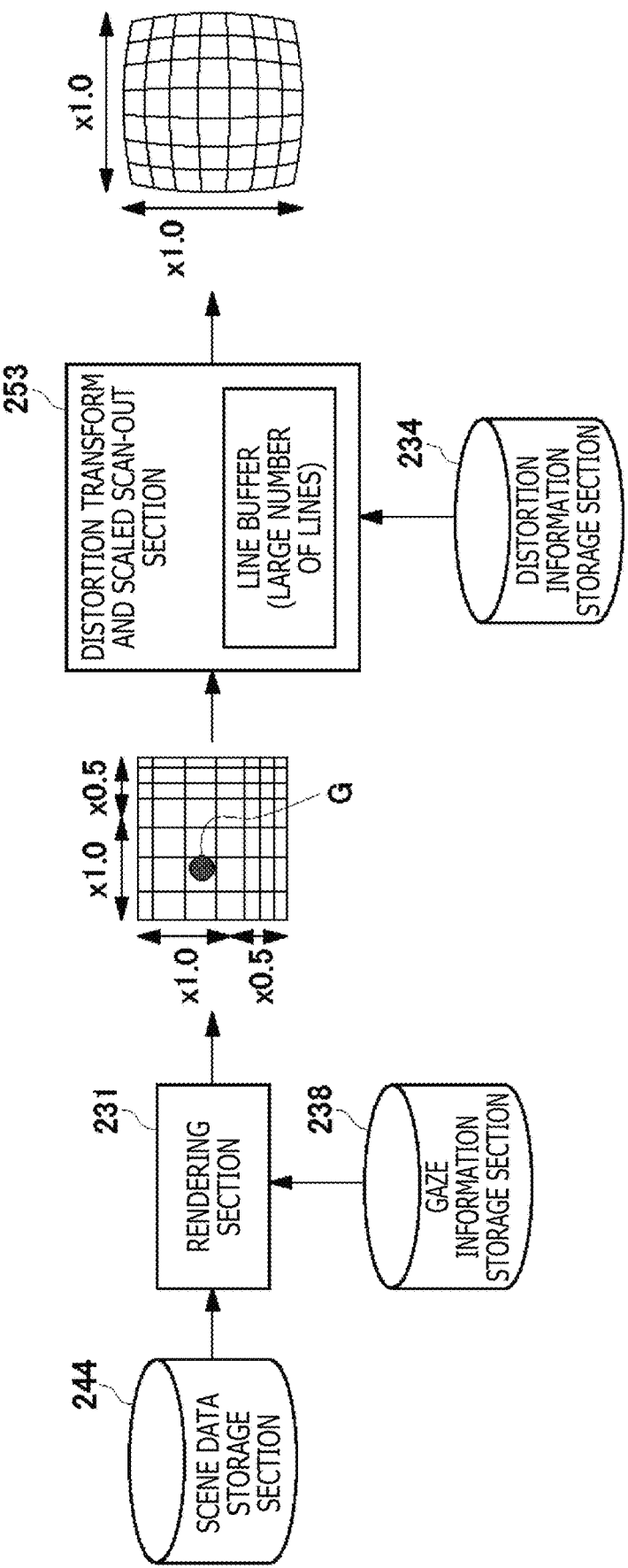
FIG. 20 is a diagram illustrating a modified example of the known rendering processing in FIG. 17.

FIG. 20 is a diagram illustrating a modified example of the known rendering processing in FIG. 17. In FIG. 20, the configuration of the distortion transform section 233 in FIG. 17 is removed, and instead a distortion transform and scaled scan-out section 253 is provided. The rendering section 231 renders a gaze image on the basis of scene data and gaze information. The distortion transform and scaled scan-out section 253 reads out the gaze image into the line buffer, executes distortion transform and scaling processing during scan-out, and outputs an unmagnified image. The number of line buffers varies according to the intensity of distortion. A large number of line buffers are needed to resist intense deformation in the y direction. In contrast, in the distortion rendering processing of the present embodiment in FIG. 18, only scaling is performed during scan-out, and advantageously the amount of buffer for two lines is sufficient for bilinear interpolation.

Third Embodiment

The distortion rendering processing of the first embodiment can be applied to reprojection. By utilizing distortion information utilized in the first embodiment to execute distortion transform simultaneously with reprojection processing, a distorted image (referred to as a "reprojection distorted image") can be generated that is reprojected from a distorted image rendered.

Now, reprojection will be described. In a case where the head-mounted display 100 is provided with a head tracking function and a virtual reality video is generated by varying the point of view and the line-of-sight direction in conjunction with motion of the head of the user, delay from generation until display of the virtual reality video leads to a difference between the orientation of the head of the user used as a basis during video generation and the orientation of the head of the user at the point of time when the video is displayed on the head-mounted display 100, causing the user to have a sensation of getting drunk (the sensation is referred to as "VR sickness (Virtual Reality sickness)" in some cases.

As described above, a long time is required for a process starting with detection of motion of the head-mounted display 100, including issuance of a rendering command by a CPU (Central Processing Unit) and execution of rendering by a GPU (Graphics Processing Unit), and ending with output of a rendered image to the head-mounted display 100. It is assumed that rendering is performed at a frame rate of, for example, 60 fps (frame/seconds) and that there is a delay equivalent to one frame between detection of motion of the head-mounted display 100 and output of an image. This corresponds to approximately 16.67 milliseconds at a frame rate of 60 fps, and this amount of time is sufficient for human beings to sense the difference.

Thus, processing referred to as "time warp" or "reprojection" is executed to correct a rendered image according to the latest position and orientation of the head-mounted display 100 to make human beings less likely to sense the difference.

Figure 21:
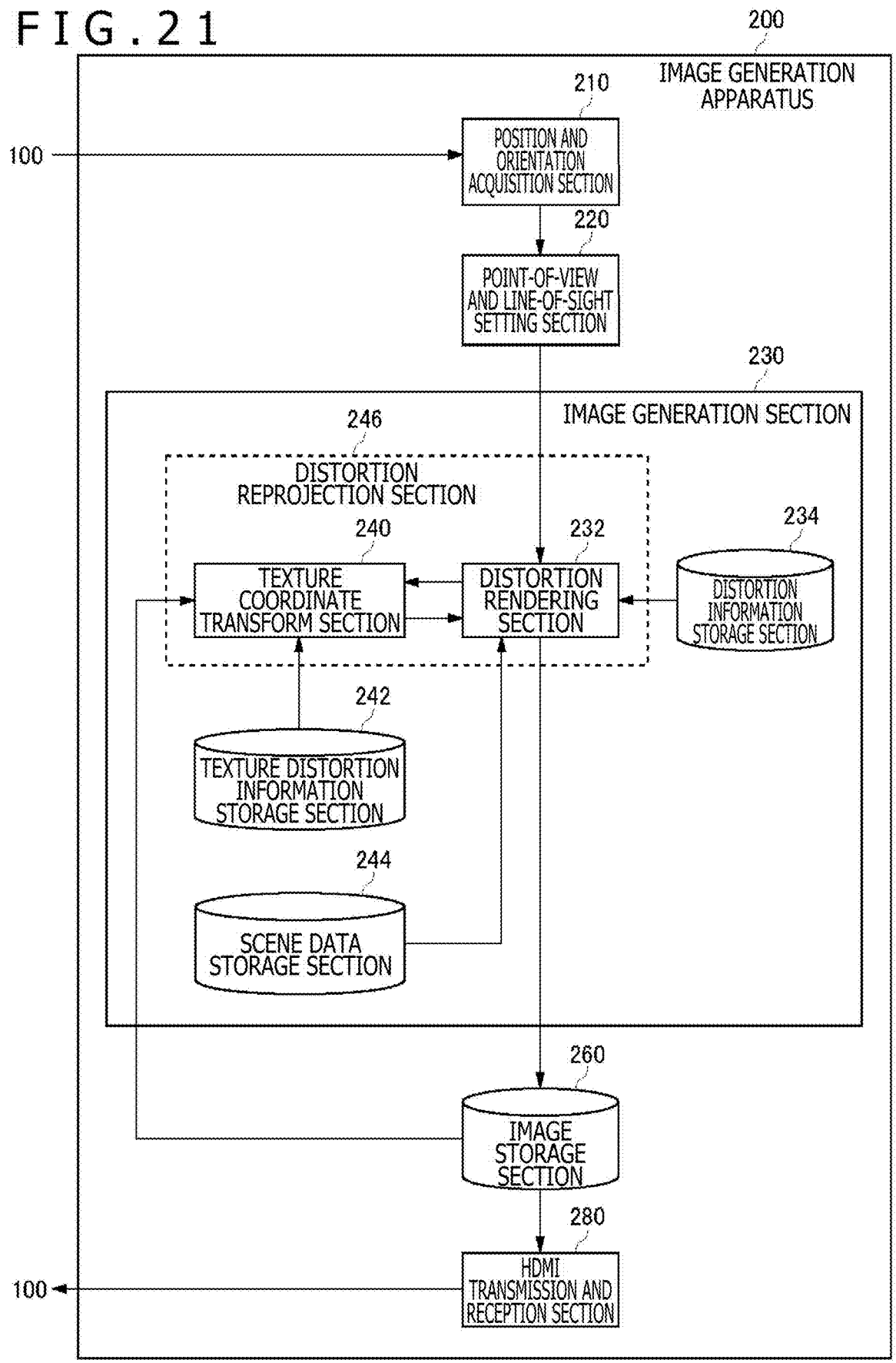
FIG. 21 is a configuration diagram of an image generation apparatus of a third embodiment.

FIG. 21 is a configuration diagram of the image generation apparatus 200 of a third embodiment.

Components and operations different from the components and operations of the image generation apparatus 200 of the first embodiment will be described, description of common components and operations omitted.

When performing rendering on the basis of scene data, the distortion rendering section 232 generates a distorted image on the basis of distortion information as is the case with the first embodiment. However, during reprojection, the distortion rendering section 232 utilizes a distorted image already generated as a texture to subject the distorted image to trapezoid transform to generate a reprojection distorted image. During reprojection, the distortion rendering section 232 cooperates with a texture coordinate transform section 240, and thus the distortion rendering section 232 and the texture coordinate transform section 240 function as a distortion reprojection section 246.

The distortion rendering section 232 provides the texture coordinate transform section 240 with coordinates of a virtual texture to be referenced. The texture coordinate transform section 240 reads out texture distortion information from the texture distortion information storage section 242, and on the basis of the texture distortion information, transforms, into coordinate values of an actual texture, coordinate values of a virtual texture referenced by the distortion rendering section 232. On the basis of the coordinate values of the actual texture transformed, the texture coordinate transform section 240 reads out pixel data from the distorted image corresponding to the actual texture, and provides the pixel data to the distortion rendering section 232.

Figure 22:
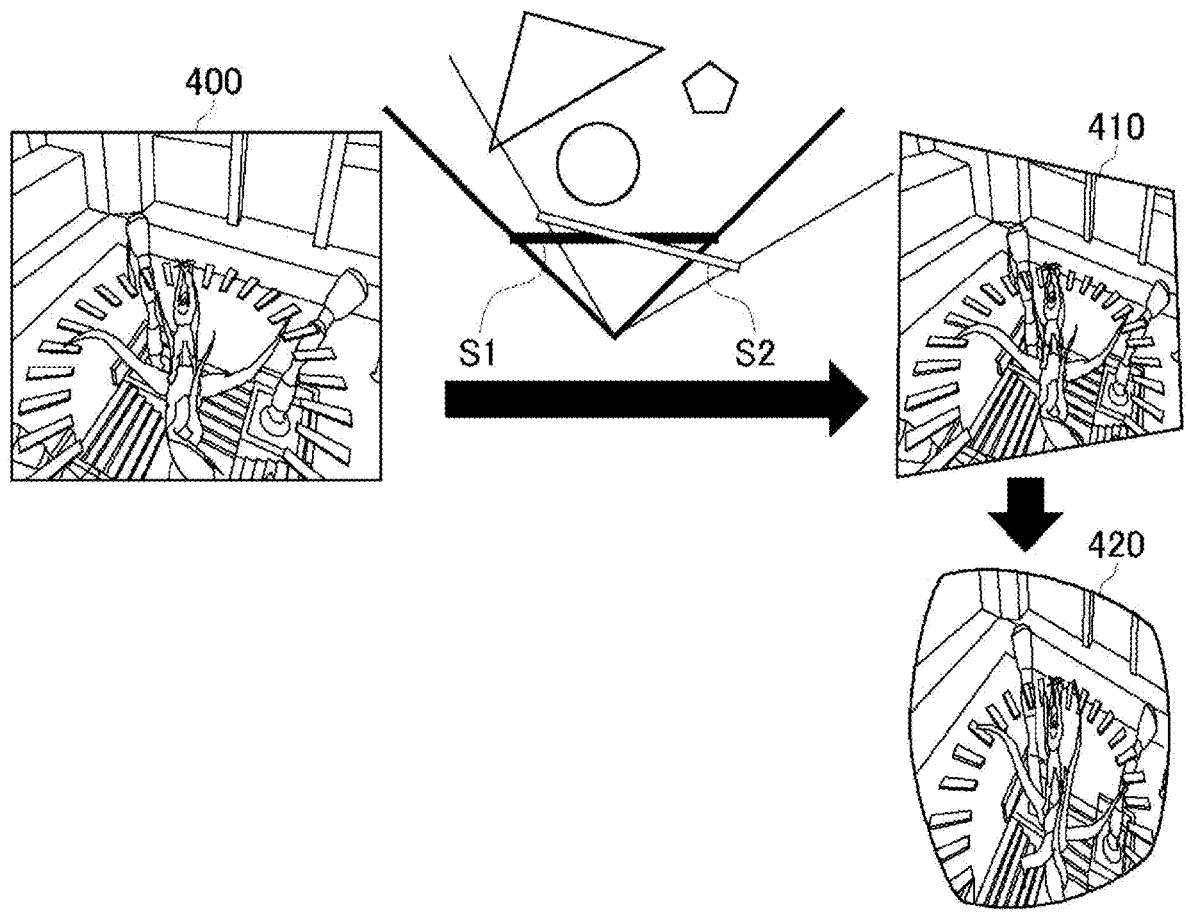
FIG. 22 is a diagram illustrating known reprojection processing.

FIG. 22 is a diagram illustrating known reprojection processing. At point of time t2, a projection surface S2 of the head-mounted display 100 is rotated according to the orientation of the user, with respect to a projection surface S1 of the head-mounted display 100 at point of time t1. In the reprojection processing, to cause a non-distorted image 400 rendered on the projection surface S1 to be displayed on the projection surface S2, trapezoid transform is performed on the non-distorted image 400 to generate a reprojection image 410.

The non-distorted image 400 is rendered according to the orientation of the head-mounted display 100 at point of time t1. The non-distorted image 400 is utilized as a texture to execute reprojection processing according to the latest orientation of the head-mounted display 100 at point of time t2, to thereby generate a reprojection image 410. Subsequently, the reprojection image 410 is subjected to distortion transform to generate a distorted image 420.

Figure 23:
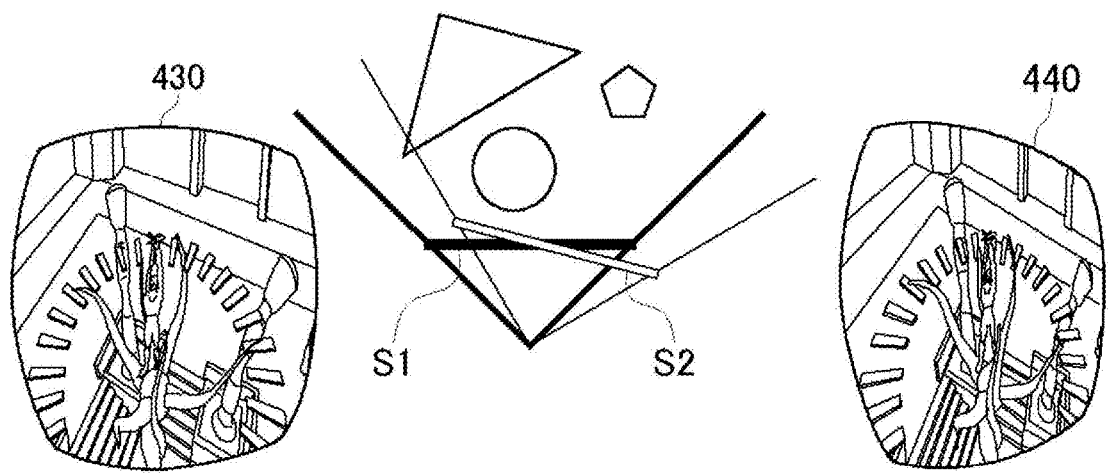
FIG. 23 is a diagram illustrating distortion reprojection processing of the third embodiment.

FIG. 23 is a diagram illustrating distortion reprojection processing of the present embodiment. The distortion rendering section 232 uses the distortion rendering processing to render a distorted image 430 on the projection surface S1 according to the orientation of the head-mounted display 100 at point of time t1. The distortion reprojection section 246 utilizes the distorted image 430 as a texture to execute distortion reprojection processing according to the latest orientation of the head-mounted display 100 at point of time t2, to thereby render a reprojection distorted image 440 on the projection surface S2. In the distortion reprojection processing, the trapezoid transform and the distortion transform are simultaneously performed.

Figure 24:
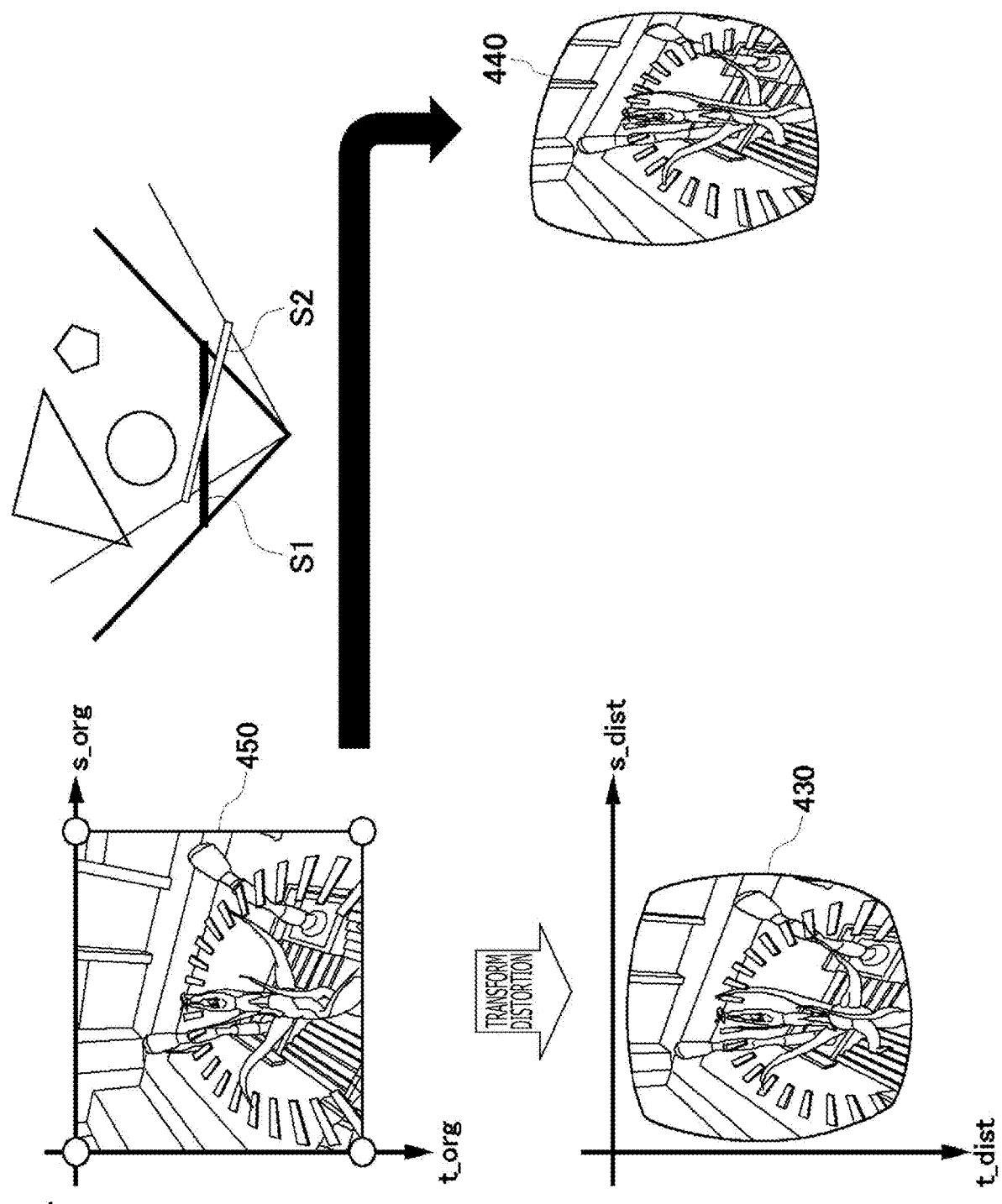
FIG. 24 is a diagram illustrating the distortion reprojection processing of the third embodiment in further detail.

FIG. 24 is a diagram illustrating the distortion reprojection processing of the present embodiment in further detail.

In the present embodiment, the distortion rendering section 232 generates a distorted image in the frame buffer without generating a non-distorted image in the frame buffer. Thus, no non-distorted image is present in the frame buffer, and thus no non-distorted image is subjected to the reprojection processing in which the trapezoid transform and the distortion transform are simultaneously performed. Thus, when the distorted image 430 is utilized as a texture, a virtually non-distorted texture (referred to as a "virtual texture") is assumed, and distortion reprojection processing is executed on a virtual texture 450. The virtual texture is not distorted, and thus the distortion rendering processing of the present embodiment is applied to subject the virtual texture to distortion transform simultaneously with trapezoid transform, allowing a reprojection distorted image 440 to be generated.

However, the virtual texture 450 does not really exist, and thus data access to the virtual texture 450 is transformed into data access to the distorted image 430, corresponding to a distorted actual texture actually generated in the frame buffer. Accordingly, data can be acquired from the distorted image 430, corresponding to the actual texture. Coordinate transform from the virtual texture 450 into the distorted image 430, corresponding to an actual texture, is the same distortion transform as that applied to the distortion information referenced in the distortion rendering processing. However, for utilization as a texture, texture coordinates are introduced, and scale and offset are adjusted. The virtual texture 450 is provided in a virtual-texture coordinate system s org-t org, and the distorted image 430, corresponding to an actual texture, is provided in an actual-texture coordinate system s dist-t dist. Scaling is performed to set the image size to satisfy s=1.0 and t=1.0, and offset is performed to set the upper left coordinates of the image to satisfy s=0 and t=0. The texture distortion information required for transform of the texture coordinates is determined in advance from the distortion information referenced in the distortion rendering processing.

Figure 25:
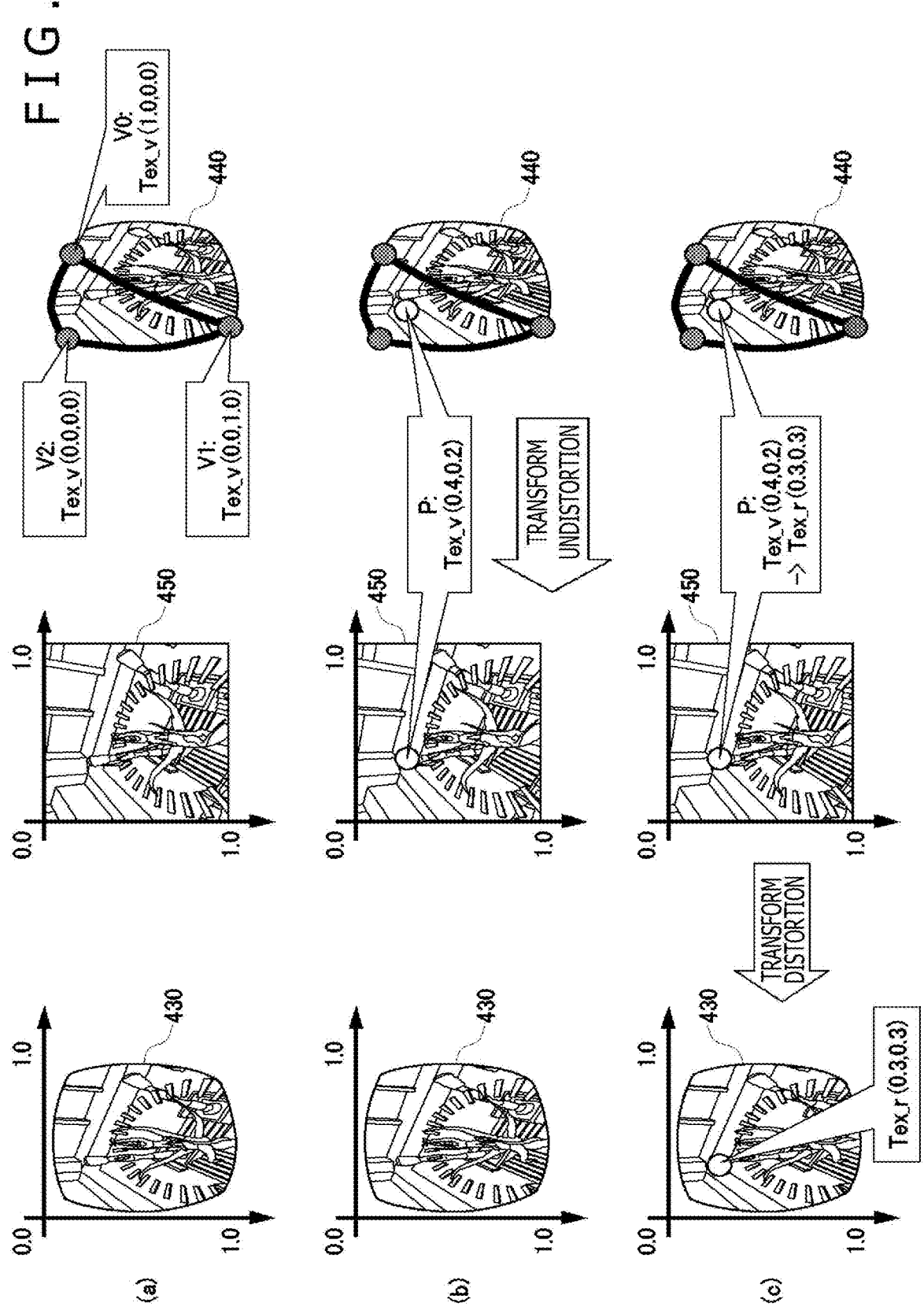
FIGS. 25(a) to 25(c) are diagrams illustrating a procedure for the distortion reprojection processing.

FIGS. 25(a) to 25(c) are diagrams illustrating a procedure for the distortion reprojection processing. As depicted in FIG. 25(a), the virtual texture 450 is divided into two large triangles, and virtual texture coordinates are set for vertices v0, v1, and v2 of each of the triangles as follows.

v0: Tex_v (1.0, 0.0)
v1: Tex_v (0.0, 1.0)
v2: Tex_v (0.0, 0.0)

Trapezoid transform and distortion transform make the three vertices of the virtual texture 450 correspond to three vertices of a distorted triangle on a projection surface S2. The distortion rendering section 232 executes the distortion rendering processing described in the first embodiment 1, on a distorted triangle for rasterization. Now, as depicted in FIG. 25(b), rasterization of a pixel P will be described. Application of undistortion transform to the pixel P allows virtual texture coordinates of the pixel P to be determined as follows, for example.

P: Tex_v (0.4, 0.2)

The virtual texture is only virtually present and is not actually present in the frame buffer. Thus, when distortion transform is used to transform virtual texture coordinates into actual texture coordinates, then as depicted in FIG. 25(c), the actual texture coordinates of the pixel P are determined as follows, for example. In this case, virtual texture coordinates Tex_v (0.4, 0.2) are transformed into actual texture coordinates Tex_r (0.3, 0.3).

P: Tex_r (0.3, 0.3)

When the pixel P is actually sampled, sampling is performed from the distorted image 430 on the basis of the actual texture coordinates Tex_r (0.3, 0.3). Points inside the two triangles are rasterized by the distortion rendering processing to eventually generate a reprojection distorted image 440.

Figure 26:
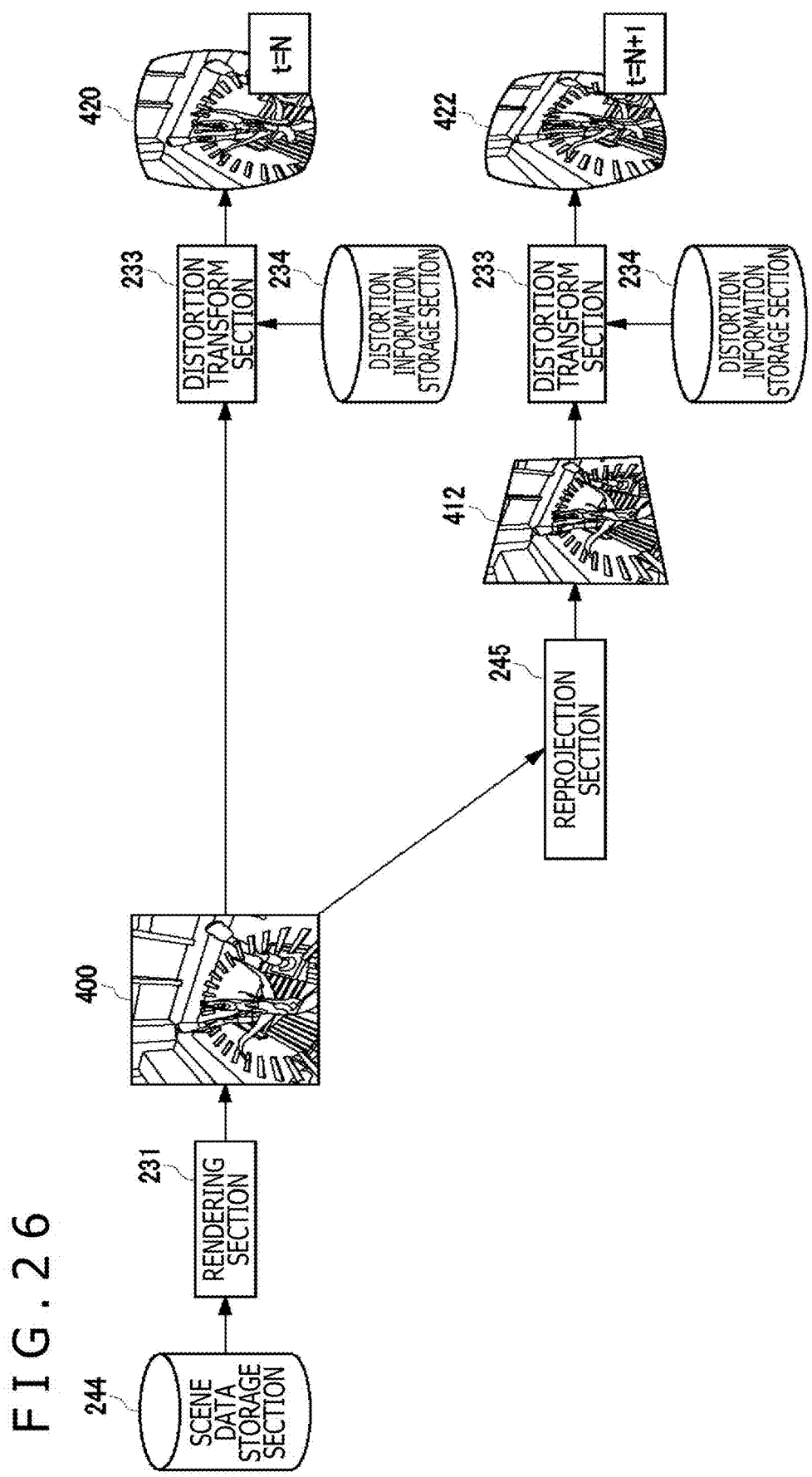
FIG. 26 is a diagram illustrating a procedure for known reprojection processing.

FIG. 26 is a diagram illustrating a procedure for known reprojection processing. In this case, a case is assumed where a simple scene is rendered and the rendering does not require a long time, leading to a short prediction time for reprojection. The rendering section 231 renders the non-distorted image 400 at point of time t=N on the basis of the scene data, and the distortion transform section 233 distortion-transforms the non-distorted image 400 on the basis of the distortion information, generating a distorted image 420 at point of time t=N. In a case where an image is output at a higher frame rate than in the rendering processing, a reprojection section 245 executes reprojection processing on the non-distorted image 400, corresponding to a rendering result at the preceding point of time t=N, to generate a reprojection non-distorted image 412. The distortion transform section 233 distortion-transforms the reprojection non-distorted image 412 on the basis of the distortion information to generate a reprojection distorted image 422 at point of time t=N+1.

Figure 27:
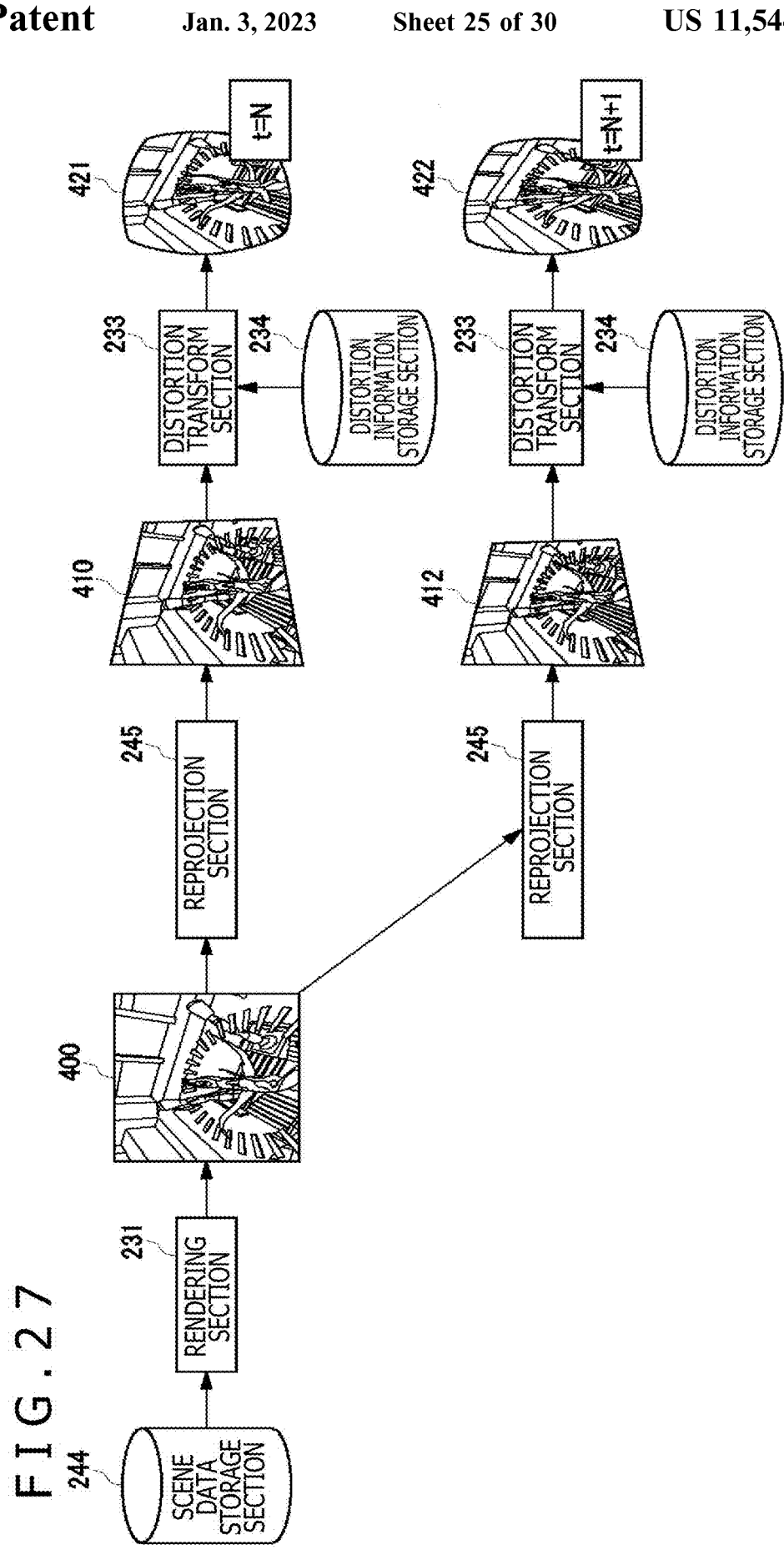
FIG. 27 is a diagram illustrating a procedure for the known reprojection processing.

FIG. 27 is a diagram illustrating a procedure for the known reprojection processing. Now, a case is assumed where a complicated scene is rendered and the rendering requires a long time, leading to a long prediction time for reprojection. The rendering section 231 renders the non-distorted image 400 on the basis of the scene data. However, since the rendering requires a long processing time, the reprojection section 245 executes the reprojection processing on the non-distorted image 400 to generate a reprojection image 410 at point of time t=N, and the distortion transform section 233 distortion-transforms the reprojection image 410 on the basis of the distortion information to generate a reprojection distorted image 421 at point of time t=N. Additionally, at the next point of time N+1, the reprojection section 245 executes the reprojection processing on the non-distorted image 400 to generate a reprojection image 410 at point of time t=N+1. The distortion transform section 233 distortion-transforms the reprojection image 410 on the basis of the distortion information to generate a reprojection distorted image 421 at point of time t=N+1.

In either of the cases in FIGS. 26 and 27, the prediction time for the reprojection is the total of the time required for the reprojection processing, a synchronization wait time, and the time required for the distortion transform.

Figure 28:
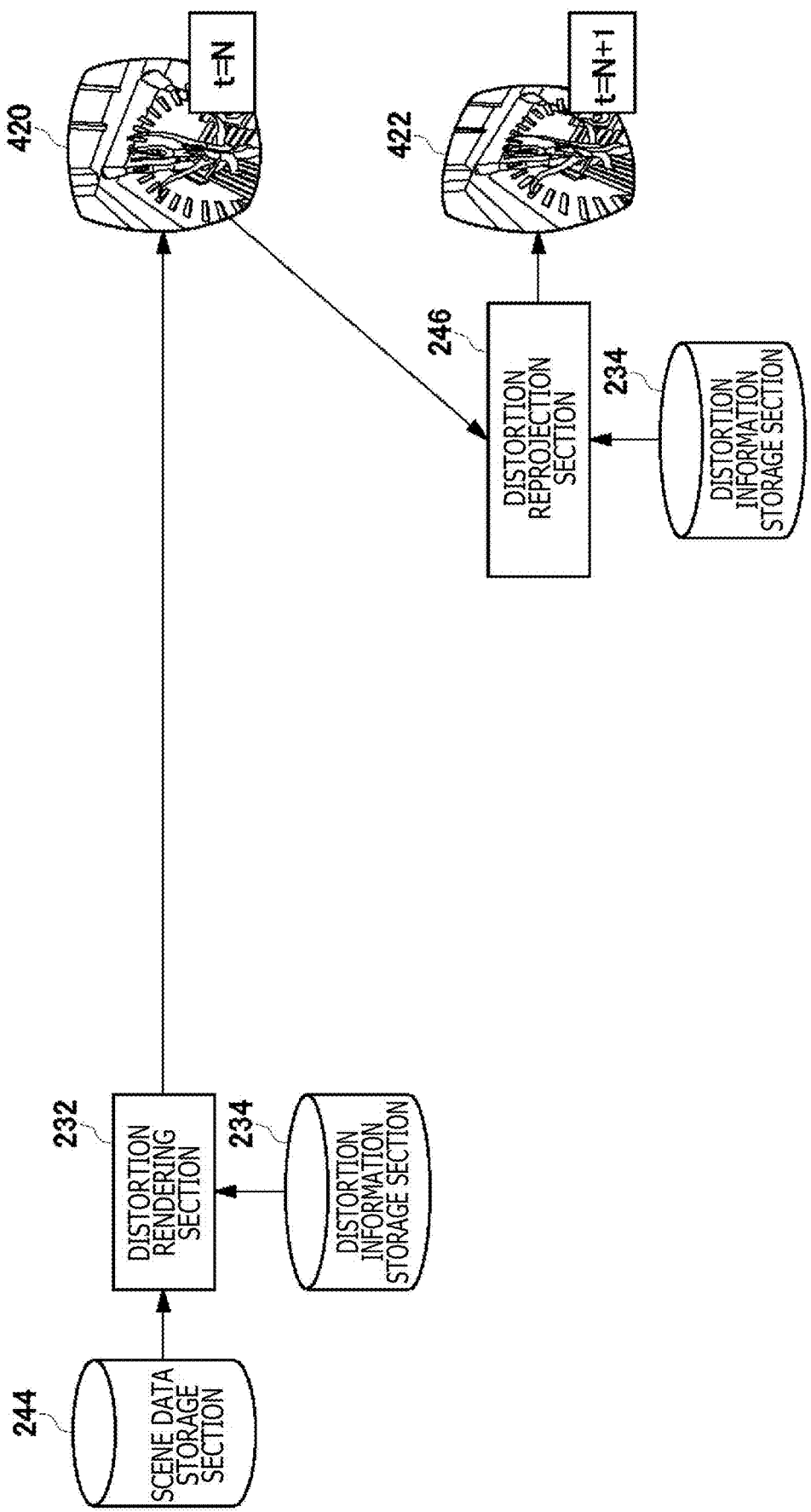
FIG. 28 is a diagram illustrating a procedure for the distortion reprojection processing of the third embodiment.

FIG. 28 is a diagram illustrating a procedure for the distortion reprojection processing of the present embodiment. In this case, a case is assumed where a simple scene is rendered and the rendering does not require a long time, leading to a short prediction time for reprojection. The distortion rendering section 232 renders the distorted image 420 at point of time t=N on the basis of the scene data and distortion information. The distortion reprojection section 246 executes the distortion reprojection processing on the distorted image 420 at point of time t=N according to the orientation the head-mounted display 100 at point of time t=N+1, to thereby generate a distortion reprojection distorted image 422 at point of time t=N+1.

Figure 29:
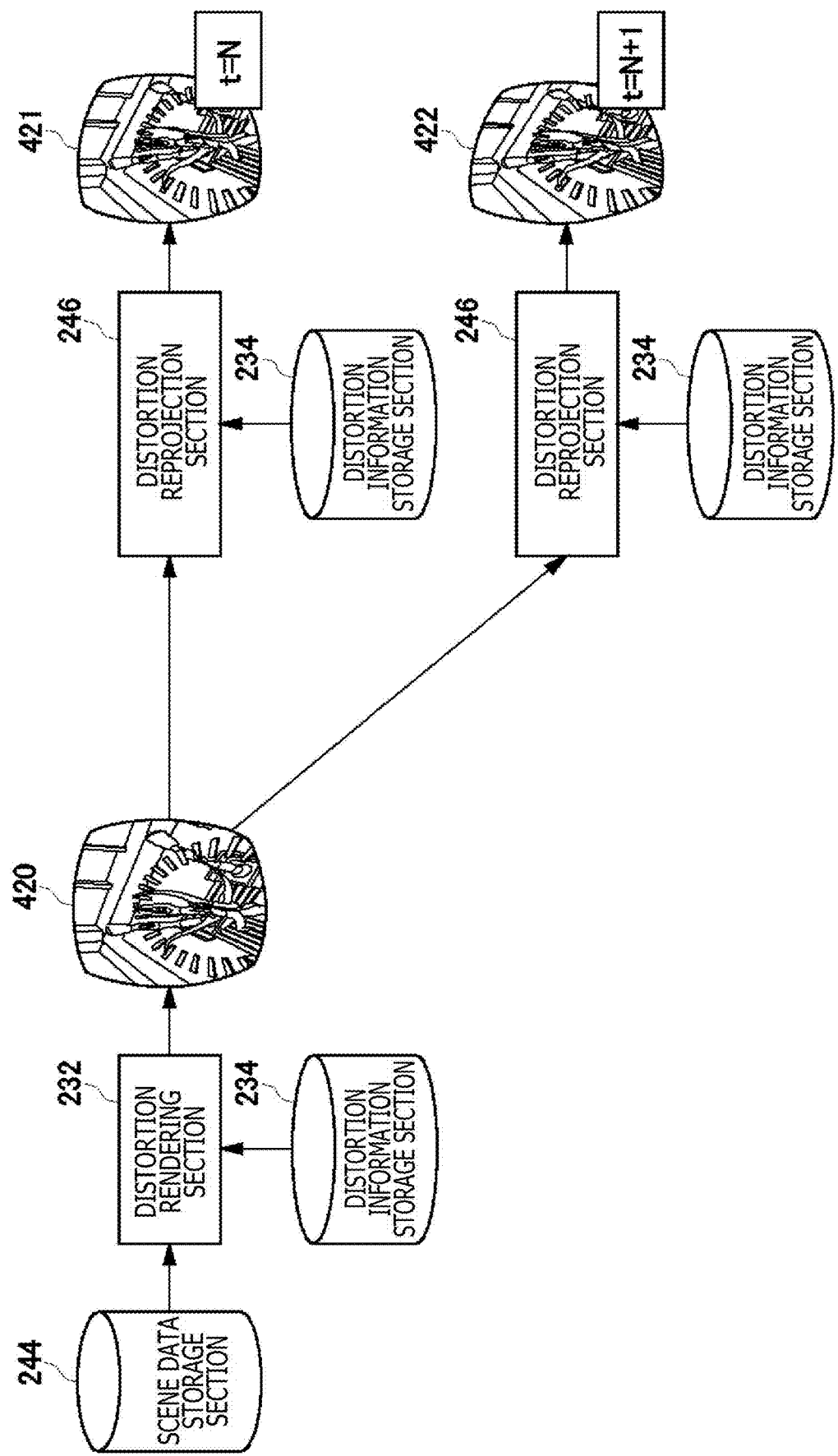
FIG. 29 is a diagram illustrating the procedure for the distortion reprojection processing of the third embodiment.

FIG. 29 is a diagram illustrating a procedure for the distortion reprojection processing of the present embodiment. Now, a case is assumed where a complicated scene is rendered and the rendering requires a long time, leading to a long prediction time for reprojection. The distortion rendering section 232 renders the distorted image 420 on the basis of the scene data and distortion information. The distortion reprojection section 246 executes the distortion reprojection processing on the distorted image 420 to generate a distortion reprojection distorted image 421 at point of time t=N. At the next point of time t=N+1, the distortion reprojection section 246 executes the distortion reprojection processing on the distorted image 420 to generate a distortion reprojection distorted image 422 at point of time t=N+1.

In either of the cases in FIGS. 28 and 29, the prediction time for the reprojection is only the time required for the distortion reprojection processing and is thus shorter than the prediction time for the known reprojection processing in FIGS. 26 and 27. Consequently, latency is reduced, and prediction accuracy can be expected to be increased. Additionally, the intermediate buffer is not used, enabling a reduction in memory resources. For mobile equipment, memory access is reduced, leading to a concomitant power saving effect.

Fourth Embodiment

A case will be described which involves a combination of foveated rendering in the second embodiment and the reprojection in the third embodiment.

Figure 30:
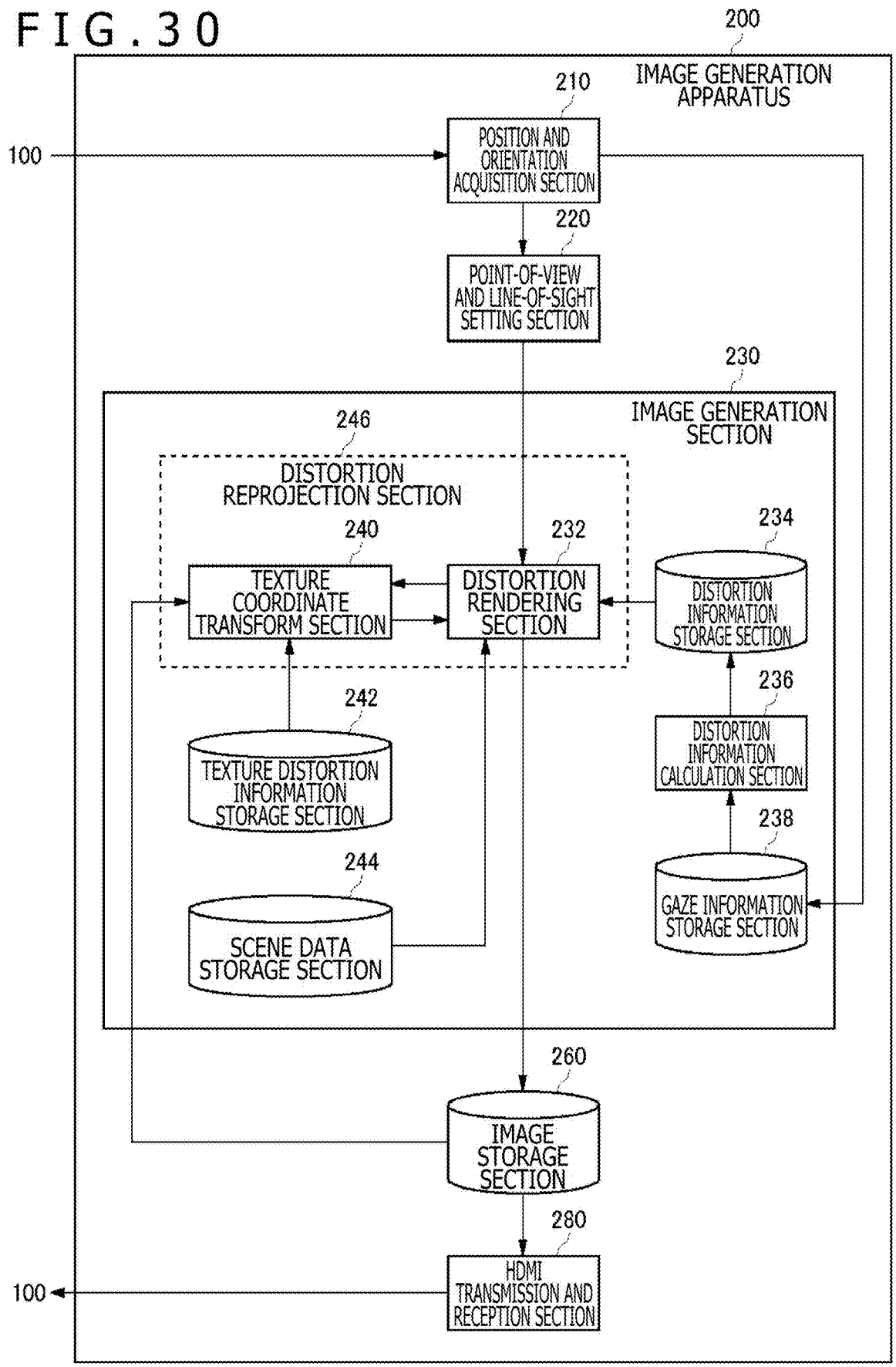
FIG. 30 is a configuration diagram of an image generation apparatus according to a fourth embodiment.

FIG. 30 is a configuration diagram of the image generation apparatus 200 according to a fourth embodiment. The components and operations associated with the distortion information calculation section 236 have been described in the second embodiment, and the components and operations associated with the distortion reprojection section 246 have been described in the third embodiment. Thus, the description of the components and operations is omitted, and now, combinations of the components and operations will be described below.

Figure 31:
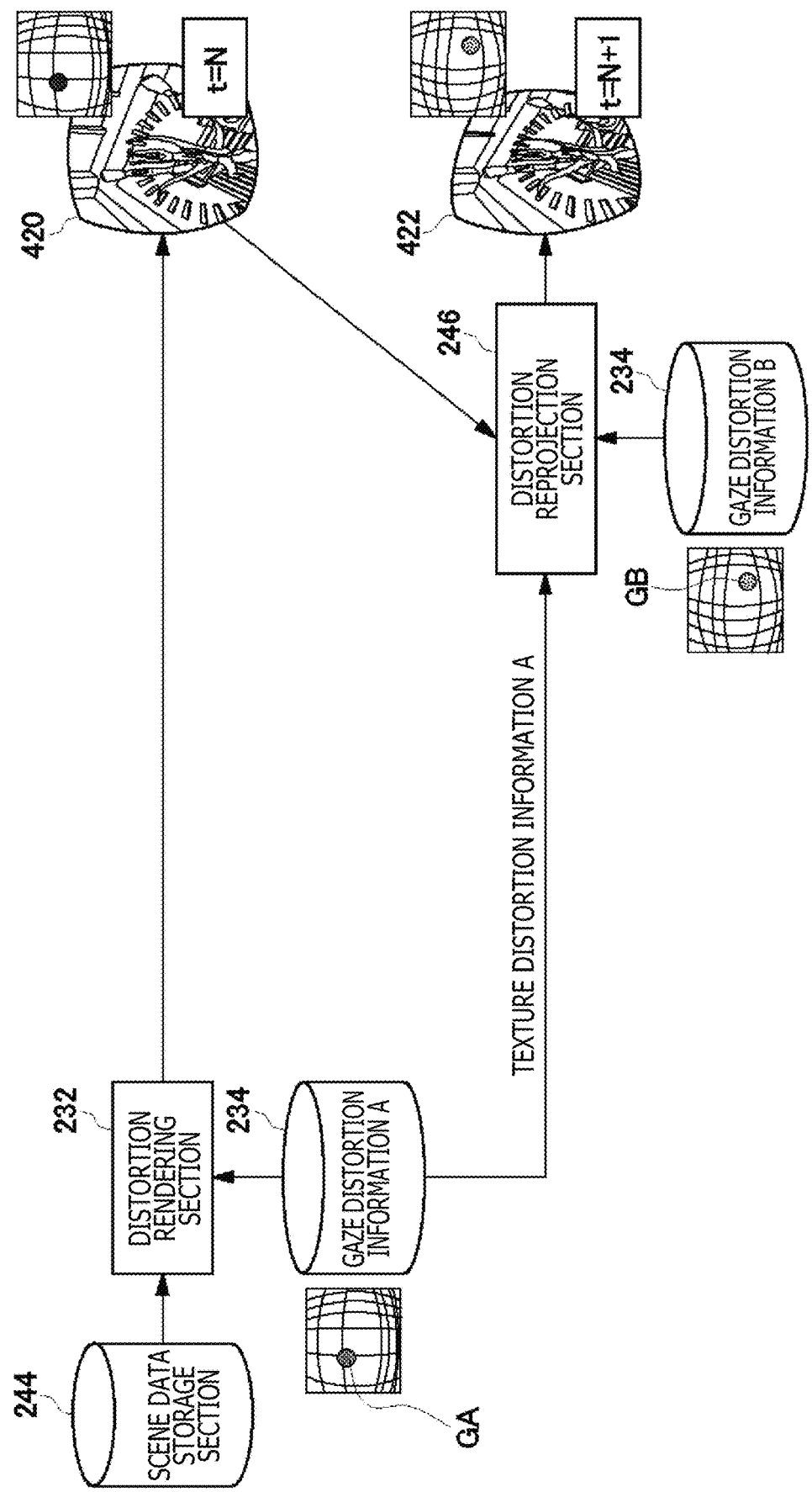
FIG. 31 is a diagram illustrating a procedure for distortion reprojection processing of the fourth embodiment.

FIG. 31 is a diagram illustrating a procedure for distortion reprojection processing of the present embodiment. A case is assumed in which the rendering requires a relatively short time, leading to a short reproduction prediction time. It should be noted that the distortion information storage section 234 holds, at point of time t=N, gaze distortion information A generated by the distortion information calculation section 236 on the basis of information regarding the gaze point GA, and holds, at point of time t=N+1, gaze distortion information B generated by the distortion information calculation section 236 on the basis of information regarding the gaze point GB and that the gaze distortion information varies with time.

The distortion rendering section 232 renders the gaze distorted image 420 at point of time t=N on the basis of the scene data and the gaze distortion information A.

The distortion reprojection section 246 executes the distortion reprojection processing on the gaze distorted image 420 at point of time t=N according to the orientation of the head-mounted display 100 at point of time t=N+1. The distortion reprojection section 246 utilizes the texture distortion information A at point of time t=N for texture coordinate transform and utilizes the gaze distortion information B at point of time t=N+1 for distortion transform. This is because when referencing the virtual texture corresponding to the gaze distorted image 420 at point of time t=N, the texture coordinate transform section 240 utilizes the texture distortion information A at point of time t=N but when executing the distortion reprojection processing on the gaze distorted image 420, the distortion rendering section 232 performs distortion transform on the basis of the gaze distortion information B at point of time t=N+1. In this manner, the distortion reprojection section 246 generates a reprojection gaze distorted image 422 at point of time t=N+1 from the gaze distorted image 420 at point of time t=N.

Figure 32:
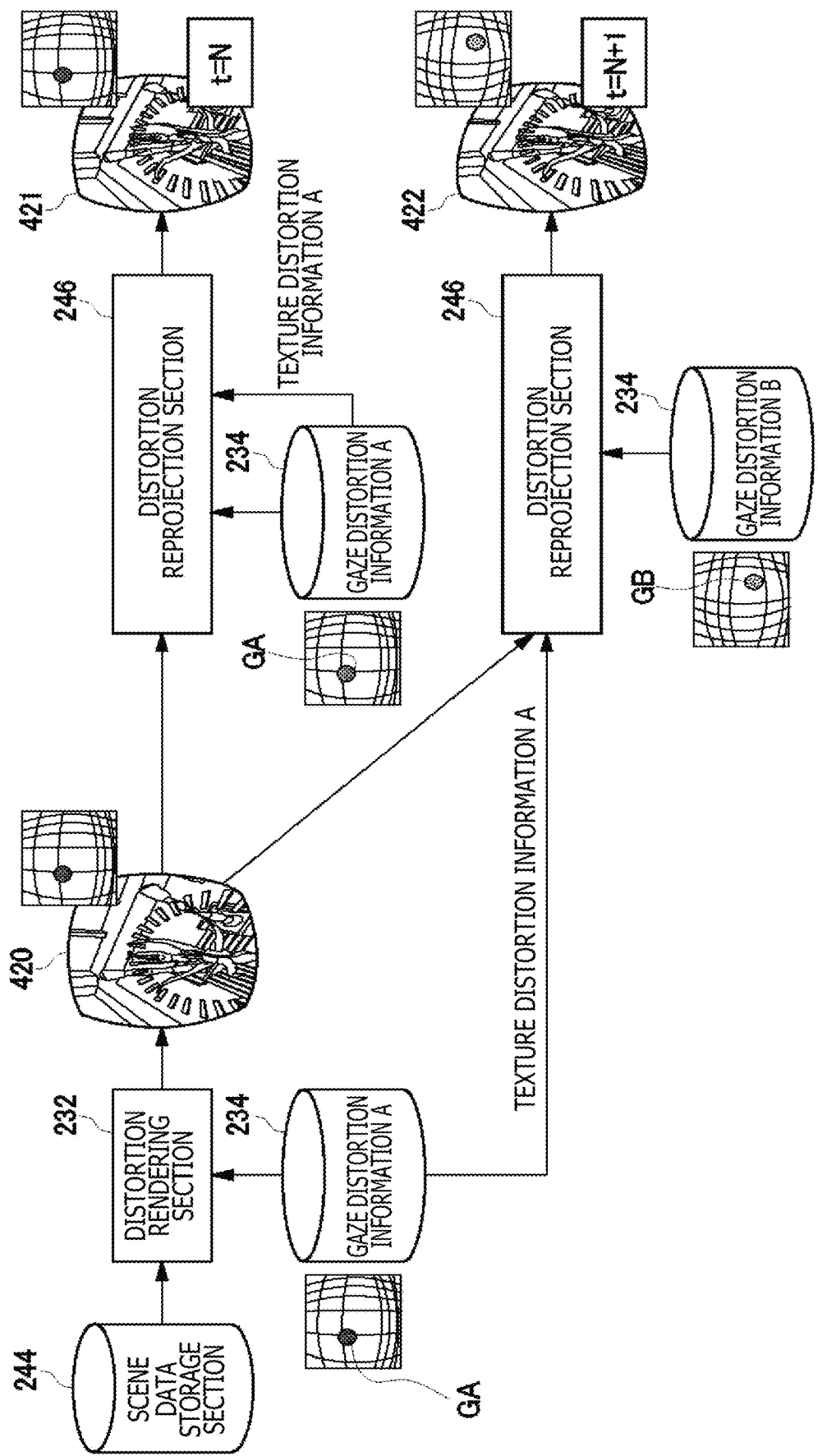
FIG. 32 is a diagram illustrating the procedure for the distortion reprojection processing of the fourth embodiment.

FIG. 32 is a diagram illustrating a procedure for the distortion reprojection processing of the present embodiment. A case is assumed in which the rendering requires a relatively long time, leading to a long prediction time for reprojection. As in the case of FIG. 31, the distortion information storage section 234 holds, at point of time t=N, the gaze distortion information A generated on the basis of information regarding the gaze point GA, and holds, at point of time t=N+1, gaze distortion information B generated on the basis of information regarding the gaze point GB.

The distortion rendering section 232 renders the distorted image 420 on the basis of the scene data and the gaze distortion information A. The distortion reprojection section 246 executes the distortion reprojection processing on the distorted image 420, and utilizes the texture distortion information A at point of time t=N for texture coordinate transform, while utilizing the gaze distortion information A at point of time t=N for distortion transform. In this manner, the distortion reprojection section 246 generates a reprojection gaze distorted image 421 at point of time t=N from the distorted image 420.

At the next point of time t=N+1, the distortion reprojection section 246 executes the distortion reprojection processing on the distorted image 420, and utilizes the texture distortion information A at point of time t=N for texture coordinate transform, while utilizing the gaze distortion information B at point of time t=N+1 for distortion transform. In this manner, the distortion reprojection section 246 generates a reprojection gaze distorted image 422 at point of time t=N+1 from the distorted image 420.

In the distortion reprojection processing of the present embodiment, the texture distortion information and the gaze distortion information are individually used during reprojection to enable reprojection corresponding to the foveated rendering.

In any of the embodiments described above, a case where nonlinear distortion occurs in the display image as in the optical system of the head-mounted display 100. However, the distortion is not limited to the nonlinear form, and the distortion rendering processing can be applied even to liner distortion. For example, in a case where projection mapping is performed on a wall, a projector is slantly installed in such a manner as to look up at the wall, and thus the image needs to be subjected to trapezoid transform in advance. Even in a case where the image is subjected to such linear distortion, the distortion rendering is applied to simultaneously execute the rendering processing and the distortion transform, thus enabling a reduction in memory capacity and in processing time. Rendering on a head-up display or a windshield of a car also requires distortion transform of an image, and the distortion rendering can be similarly applied. As described above, as distortion transform, besides linear deformation that can be expressed by a homogeneous coordinate matrix such as enlargement and reduction, translation, and rotation, optional deformation can be assumed such as nonlinear deformation which fails to be expressed by the homogeneous coordinate matrix and as expressed by a second- or higher-order polynomial, for example, distortion of a lens.

The present invention has been described on the basis of the embodiments. Those skilled in the art would understand that the embodiments are illustrative and that various modifications can be made to combinations of the components and processes in the embodiments and that such modifications are also within the scope of the present invention.

REFERENCE SIGNS LIST

10: Control section
20: Input interface
30: Output interface
32: Display panel
40: Communication control section
42: Network adapter
44: Antenna
50: Storage section
64: Orientation sensor
70: External input/output terminal interface
72: External memory
100: Head-mounted display
200: Image generation apparatus
210: Position and orientation acquisition section
220: Point-of-view and line-of-sight setting section
230: Image generation section
232: Distortion rendering section
234: Distortion information storage section
236: Distortion information calculation section
238: Gaze information storage section
240: Texture coordinate transform section
242: Texture distortion information storage section
244: Scene data storage section
246: Distortion reprojection section
260: Image storage section
280: HDMI transmission and reception section
300: Interface

INDUSTRIAL APPLICABILITY

The present invention can be utilized for image generation techniques.

The invention claimed is:

1. An image generation apparatus comprising:
   a distortion information storage section that stores, as distortion information, information for deforming and distorting an image; and
   a distortion rendering section that renders a distorted image by rasterization processing using the distortion information without generating a non-distorted image in a memory.

2. The image generation apparatus according to claim 1, wherein the distortion rendering section renders the distorted image by executing the rasterization processing on a distorted triangle obtained by transforming a triangle to be rasterized on a basis of the distortion information such that the processing is executed upward and downward from positions of vertices of the distorted triangle.

3. The image generation apparatus according to claim 2, wherein, when the distorted triangle is subjected to the upward and downward rasterization processing, the distortion rendering section performs pixel inside/outside determination and parameter generation on a non-distorted triangle before application of distortion.

4. The image generation apparatus according to claim 1, further comprising:
   a distortion information calculation section that deforms the distortion information on a basis of gaze information including information related to a resolution ratio between a gaze region and a non-gaze region for a user to generate gaze distortion information,
   wherein the rendering section renders the distorted image by the rasterization processing using the gaze distortion information without generating a non-distorted image in the memory.

5. The image generation apparatus according to claim 1, further comprising:
   a distortion reprojection processing section that uses, as a texture, the distorted image rendered by the distortion rendering section to execute, on the distorted image, the rasterization processing using the distortion information, thus reprojecting the distorted image without generating a non-distorted image in the memory.

6. The image generation apparatus according to claim 5, further comprising:
   a texture coordinate transform section that transforms coordinate values of a virtual texture obtained by removing distortion from a texture of the distorted image into coordinate values of the texture of the distorted image on a basis of the distortion information and acquires pixel data from the coordinate values of the texture of the distorted image,
   wherein the distortion reprojection processing section executes, on the virtual texture, the rasterization processing using the distortion information to reproject the distorted image without generating a non-distorted image in the memory, and when accessing the pixel data regarding the virtual texture, acquires, from the texture coordinate transform section, data regarding pixels of the texture of the distorted image corresponding to pixels of the virtual texture.

7. An image generation method comprising:

reading, as distortion information, information for deforming and distorting an image, and rendering a distorted image by rasterization processing using the distortion information without generating a non-distorted image in a memory.

8. A non-transitory computer readable medium having stored thereon a program for a computer, comprising:

by a distortion rendering section, reading, as distortion information, information for deforming and distorting an image, and rendering a distorted image by rasterization processing using the distortion information without generating a non-distorted image in a memory.

* * * * *